United States Patent
Weiss et al.

(10) Patent No.: US 11,875,081 B2
(45) Date of Patent: Jan. 16, 2024

(54) SHARED SCREEN TOOLS FOR COLLABORATION

(71) Applicant: Salesforce, Inc., San Francisco, CA (US)

(72) Inventors: Noah Weiss, Austin, TX (US); Anna Niess, New York, NY (US); Kevin Marshall, Mill Valley, CA (US); Katie Steigman, San Leandro, CA (US); Dolapo Falola, New York, NY (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/589,822

(22) Filed: Jan. 31, 2022

(65) Prior Publication Data
US 2023/0244434 A1    Aug. 3, 2023

(51) Int. Cl.
G06F 3/04845    (2022.01)
G06F 3/033    (2013.01)
H04L 12/18    (2006.01)
G06F 3/14    (2006.01)
G06F 40/169    (2020.01)
H04L 65/403    (2022.01)
H04L 65/401    (2022.01)

(52) U.S. Cl.
CPC .......... G06F 3/1454 (2013.01); G06F 40/169 (2020.01); H04L 65/403 (2013.01); H04L 65/4015 (2013.01)

(58) Field of Classification Search
CPC . G06F 3/1454; G06F 40/169; H04L 65/4015; H04L 65/403
See application file for complete search history.

(56) References Cited

U.S. PATENT DOCUMENTS

| | | | |
|---|---|---|---|
| 6,008,804 A * | 12/1999 | Pommier | H04L 9/40 709/204 |
| 7,913,178 B2 * | 3/2011 | Gould | G06F 3/04842 715/762 |
| 8,924,844 B2 * | 12/2014 | Lynch | G06F 40/169 715/233 |
| 10,721,278 B2 * | 7/2020 | Coppinger | G06F 16/287 |
| 10,848,445 B1 | 11/2020 | Willmann | |

(Continued)

OTHER PUBLICATIONS

Hu, Vincent C. et al.; Attribute Considerations for Access Control Systems; NIST Special Publication 800-205; U.S. Department of Commerce; pp. 1-42; https://doi.org/10.6028/NIST.SP.800-205; retrieved on Aug. 24, 2022.

(Continued)

*Primary Examiner* — Jordany Nunez
(74) *Attorney, Agent, or Firm* — Lee & Hayes, P.C.

(57) ABSTRACT

A system, method, and computer-readable media for persisting an annotated screen share within a group-based communication system are provided. A screen share may be received from a sharing user within a synchronous multimedia collaboration session. The screen share may be transmitted to viewing users for display. A viewing user may submit an annotation for the screen share. A sharing or viewing user may then submit a request to save the annotated screen share. The annotated screen share may be automatically persisted in association with the synchronous multimedia collaboration session.

20 Claims, 12 Drawing Sheets

(56) References Cited

U.S. PATENT DOCUMENTS

| | | | |
|---|---|---|---|
| 11,042,575 B2* | 6/2021 | Fox | G06F 16/176 |
| 11,256,387 B1 | 2/2022 | Huff et al. | |
| 11,301,200 B2* | 4/2022 | Zhang | G06F 9/451 |
| 11,374,990 B2* | 6/2022 | Lansing | H04L 65/403 |
| 2004/0267871 A1 | 12/2004 | Pratley et al. | |
| 2005/0132281 A1* | 6/2005 | Pan | G06F 40/169 |
| | | | 715/230 |
| 2005/0193325 A1* | 9/2005 | Epstein | G06F 16/9577 |
| | | | 715/230 |
| 2008/0229185 A1* | 9/2008 | Lynch | G06F 40/169 |
| | | | 715/230 |
| 2009/0157811 A1 | 6/2009 | Bailor et al. | |
| 2009/0271696 A1 | 10/2009 | Bailor et al. | |
| 2013/0080919 A1 | 3/2013 | Kiang et al. | |
| 2013/0174032 A1 | 7/2013 | Tse et al. | |
| 2013/0297680 A1 | 11/2013 | Smith et al. | |
| 2016/0226935 A1* | 8/2016 | Coppinger | G06Q 10/10 |
| 2016/0315995 A1 | 10/2016 | Hausler et al. | |
| 2017/0132200 A1 | 5/2017 | Noland et al. | |
| 2018/0157390 A1 | 6/2018 | Vas et al. | |
| 2018/0287982 A1 | 10/2018 | Draeger et al. | |
| 2019/0058680 A1 | 2/2019 | Rosania et al. | |
| 2019/0098087 A1 | 3/2019 | Johnston et al. | |
| 2019/0102472 A1 | 4/2019 | Rensburg et al. | |
| 2019/0108241 A1 | 4/2019 | Emerick et al. | |
| 2019/0166330 A1* | 5/2019 | Ma | H04L 65/403 |
| 2019/0179876 A1 | 6/2019 | Zhang et al. | |
| 2019/0325213 A1 | 10/2019 | Numata | |
| 2020/0279070 A1 | 9/2020 | Rose et al. | |
| 2020/0387567 A1 | 12/2020 | Loforte et al. | |
| 2021/0150480 A1 | 5/2021 | Haramati et al. | |
| 2021/0248556 A1 | 8/2021 | Venkatraman et al. | |
| 2021/0397402 A1* | 12/2021 | Ashkenazi | G09G 5/14 |
| 2022/0086200 A1* | 3/2022 | Lansing | H04L 65/611 |
| 2022/0222625 A1 | 7/2022 | Haramati et al. | |
| 2022/0365740 A1* | 11/2022 | Chang | H04L 65/4015 |
| 2023/0244434 A1* | 8/2023 | Weiss | G06F 40/169 |
| | | | 715/753 |

OTHER PUBLICATIONS

"Die, Email, Die! A Flickr Cofounder Aims To Cut US All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013) 2 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014) 8 pages.

Ernie Smith, "Picking Up The Slack", Tedium, [online][retrieved May 9, 2019]. Retrieved from the Internet: <URL: https://tedium.co/2017/10/17/irc-vs-slack-chat-history/> (dated Oct. 17, 2017) 13 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014) 4 pages.

Matsumoto, T. et al., "Chocoa Communicator—A New Communication System Based on Awareness and Text Communications-", Fujitsu Sci. Tech. J., 36, 2, (Dec. 2000) 154-161.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

U.S. Appl. No. 17/564,506, Non-Final Office Action dated Oct. 6, 2022.

U.S. Appl. No. 17/564,506, Final Office Action dated Feb. 3, 2023.

U.S. Appl. No. 17/589,584, Non-Final Office Action dated Jan. 20, 2023.

U.S. Appl. No. 17/589,692, Non-Final Office Action dated Jan. 18, 2023.

United States Patent and Trademark Office, U.S. Appl. No. 17/589,692, Non-Final Office Action dated Jan. 18, 2023.

Malik et al. A Comparison of Collaborative Access Control Models, IJACSA 8:3, 2017, pp. 209-206. (2017).

Bertino et al. Specifying and enforcing access control policies for XML document sources. World Wide Web 3 (2000), pp. 139-151, 2000.

U.S. Appl. No. 17/564,506, Notice of Allowance dated Jun. 5, 2023.

U.S. Appl. No. 17/589,584, Notice of Allowance dated May 18, 2023.

U.S. Appl. No. 17/589,692, Final Office Action dated May 12, 2023.

* cited by examiner

SHARED SCREEN TOOLS FOR COLLABORATION

TECHNICAL FIELD

Embodiments of the invention relate to shared screen tools for group-based communication systems. More specifically, embodiments of the invention relate to shared screen tools for annotating screen shares and persisting the annotated screen shares.

Screen sharing allows a sharing user to display their screen to one or more viewing users. Screen sharing may be used for collaboration, presentations, or troubleshooting issues. The viewing users may provide feedback to the sharing user based on what is being displayed. However, existing tools lack the ability to clearly communicate annotations and the ability to collaborate together in the same application in the shared screen. Further, screen annotations are not persisted effectively so that the annotations are useful after the screen sharing has ended.

SUMMARY

Embodiments of the invention solve the above-mentioned problems by providing a system, method, and computer-readable media for persisting an annotated screen share within a group-based communication system. A displaying user may share their screen to viewing users within a group-based communication system. Both the displaying user and the viewing user may be provided tools for annotating the screen share to provide additional information to the screen share. A displaying user may require approval before submitted annotations are displayed to viewing users. During or after the screen share, users may elect to persist the annotated screen share.

Screen shares may be persisted in multiple different formats depending on one or more of the type of file or files being shared on the screen and/or a selection of a user requesting to persist the annotated screen share. Annotated screen shares may be saved as a static image or video. In some embodiments, annotated screen shares may be saved as metadata to be associated with the one or more files displayed in the screen share. In further embodiments, annotated screen shares may be saved natively within the one or more files displayed in the screen share. The disclosed system, method, and computer-readable media allow for improved screen sharing by providing both enhanced real-time feedback and persisting the annotated screen shares for later review and with improved information.

In some aspects, the techniques described herein relate to one or more non-transitory computer-readable media storing computer-executable instructions that, when executed by a processor, perform a method for persisting an annotated screen share within a communication system, including: receiving a share request to share a screen from a first user within a synchronous multimedia collaboration session of the communication system; in response to receiving the share request, displaying the shared screen to a second user who is a member of the synchronous multimedia collaboration session; receiving an annotation on the shared screen from the second user; displaying the annotation overlaid on the shared screen to create an annotated screen share; receiving a save request to save a portion of the annotated screen share; and automatically persisting the annotated screen share in association with a virtual space associated with the synchronous multimedia collaboration session.

In some aspects, the techniques described herein relate to a media, wherein the annotation includes a overlaid annotation interface including comments provided by the second user.

In some aspects, the techniques described herein relate to a media, wherein the annotation includes a focus interface tool directing focus to a first portion of the shared screen to differentiate from a second portion of the shared screen.

In some aspects, the techniques described herein relate to a media, wherein the share request is a request to share an application of the first user with a second user, and wherein the application may be simultaneously interacted with by the first user and the second user.

In some aspects, the techniques described herein relate to a media, wherein the application in the shared screen displayed to the second user is displayed in a browser, and wherein a shared cursor is provided by the communication system allows the first user and the second user to interact with the application displayed in the browser.

In some aspects, the techniques described herein relate to a media, the method further including: providing, in the shared screen displayed to the second user, a shared cursor for the second user, the shared cursor allowing both the first user and the second user to concurrently interact with elements of the shared screen.

In some aspects, the techniques described herein relate to a media, wherein the shared cursor is provided by the communication system to enable a collaboration functionality allowing both the first user and the second user to interact with the shared cursor of an application.

In some aspects, the techniques described herein relate to a method for persisting an annotated screen share within a communication system, including: receiving a share request to share a screen from a first user within a synchronous multimedia collaboration session of the communication system; in response to receiving the share request, displaying the shared screen to a second user who is a member of the synchronous multimedia collaboration session; receiving an annotation on the shared screen from the second user; displaying the annotation overlaid on the shared screen to create an annotated screen share; receiving a save request to save a portion of the annotated screen share; and automatically persisting the annotated screen share in association with a virtual space associated with the synchronous multimedia collaboration session.

In some aspects, the techniques described herein relate to a method, wherein the annotation includes a overlaid annotation interface including comments provided by the second user.

In some aspects, the techniques described herein relate to a method, wherein the annotation includes a focus interface tool directing focus to a first portion of the shared screen to differentiate from a second portion of the shared screen.

In some aspects, the techniques described herein relate to a method, wherein the share request is a request to share an application of the first user with a second user, and wherein the application may be simultaneously interacted with by the first user and the second user.

In some aspects, the techniques described herein relate to a method, wherein the application in the shared screen displayed to the second user is displayed in a browser, and wherein a shared cursor is provided by the communication system allows the first user and the second user to interact with the application displayed in the browser.

In some aspects, the techniques described herein relate to a method, further including: providing, in the shared screen displayed to the second user, a shared cursor for the second user, the shared cursor allowing both the first user and the second user to concurrently interact with elements of the shared screen.

In some aspects, the techniques described herein relate to a method, wherein the shared cursor is provided by the communication system to enable a collaboration functionality allowing both the first user and the second user to interact with the shared cursor of an application.

In some aspects, the techniques described herein relate to a system for persisting an annotated screen share within a communication system, the system including: a data store; a processor; and one or more non-transitory computer-readable media storing computer-executable instructions that, when executed by the processor, perform a method for persisting an annotated screen share within a communication system, including: receiving a share request to share a screen from a first user within a synchronous multimedia collaboration session of the communication system; in response to receiving the share request, displaying the shared screen to a second user who is a member of the synchronous multimedia collaboration session; receiving an annotation on the shared screen from the second user; displaying the annotation overlaid on the shared screen to create an annotated screen share; receiving a save request to save a portion of the annotated screen share; and automatically persisting the annotated screen share in association with a virtual space associated with the synchronous multimedia collaboration session.

In some aspects, the techniques described herein relate to a system, wherein the annotation includes a overlaid annotation interface including comments provided by the second user.

In some aspects, the techniques described herein relate to a system, wherein the annotation includes a focus interface tool directing focus to a first portion of the shared screen to differentiate from a second portion of the shared screen.

In some aspects, the techniques described herein relate to a system, wherein the share request is a request to share an application of the first user with a second user, and wherein the application may be simultaneously interacted with by the first user and the second user.

In some aspects, the techniques described herein relate to a system, wherein the application in the shared screen displayed to the second user is displayed in a browser, and wherein a shared cursor is provided by the communication system allows the first user and the second user to interact with the application displayed in the browser.

In some aspects, the techniques described herein relate to a system, the method further including: providing, in the shared screen displayed to the second user, a shared cursor for the second user, the shared cursor allowing the second user to interact with the shared screen of the first user.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 5A:
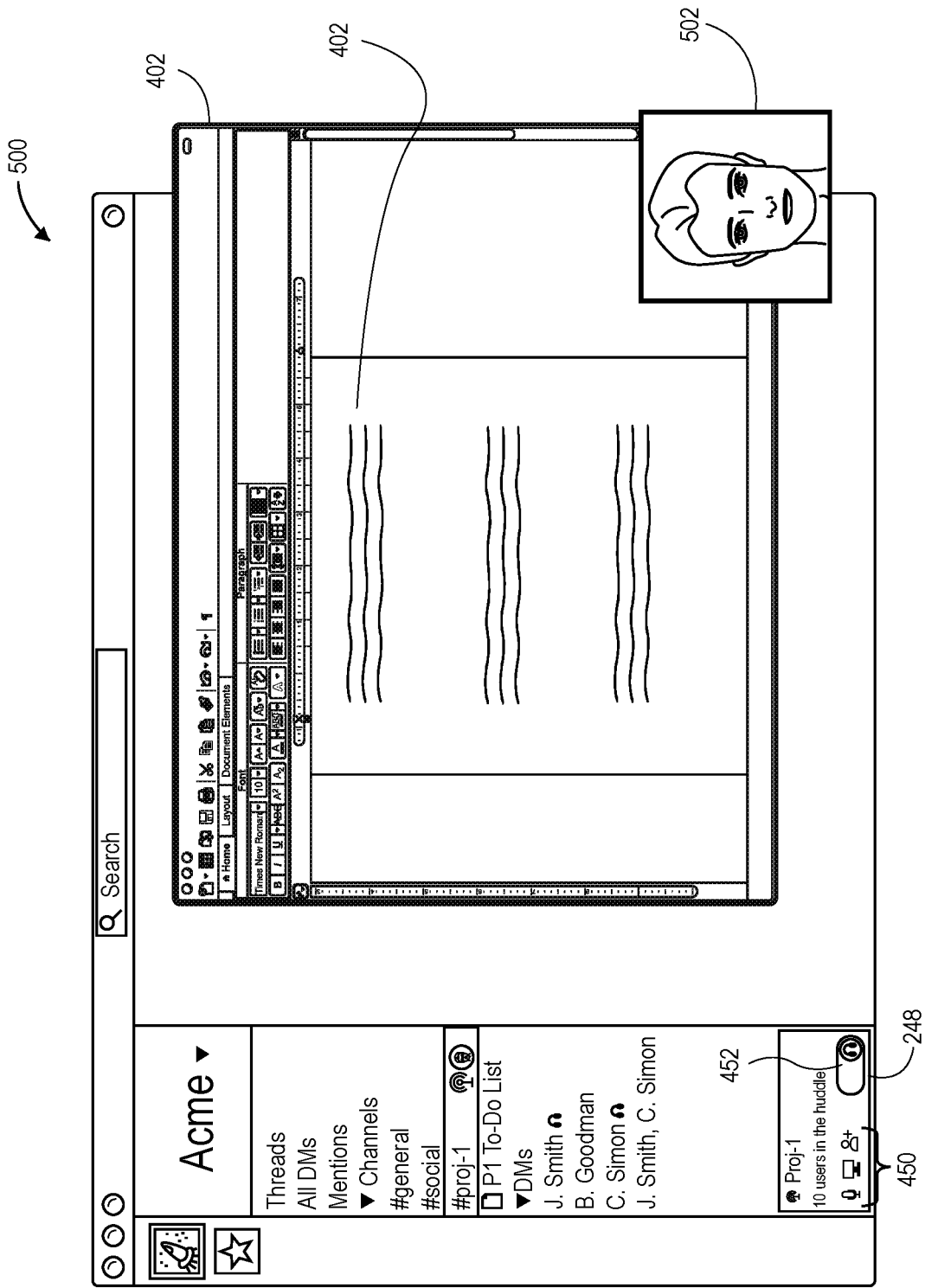
FIG. 5A depicts an exemplary embodiment of a screen sharing interface within a group-based communication system for a user to view a screen share.
Figure 5B:
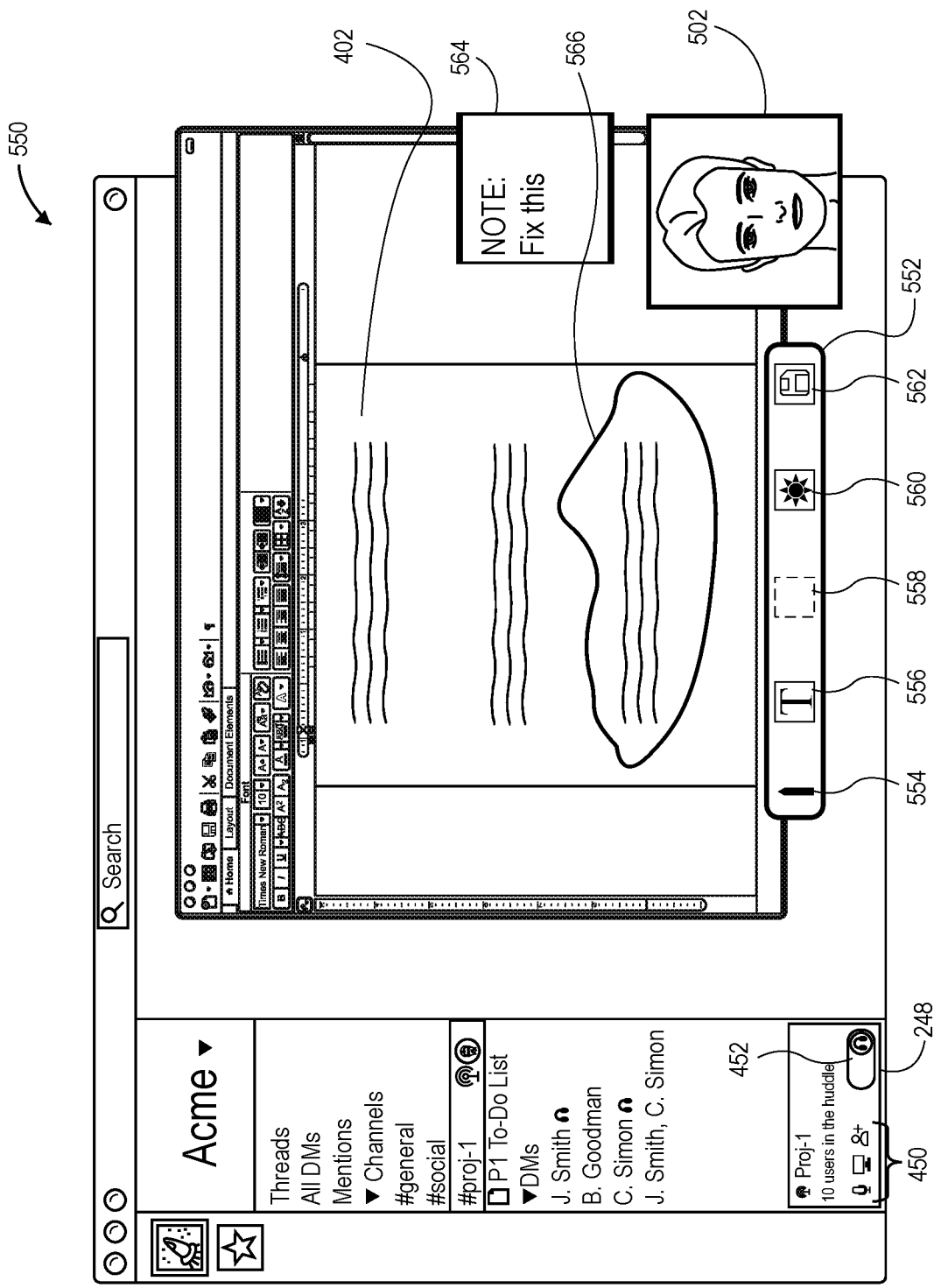
Figure 5C:
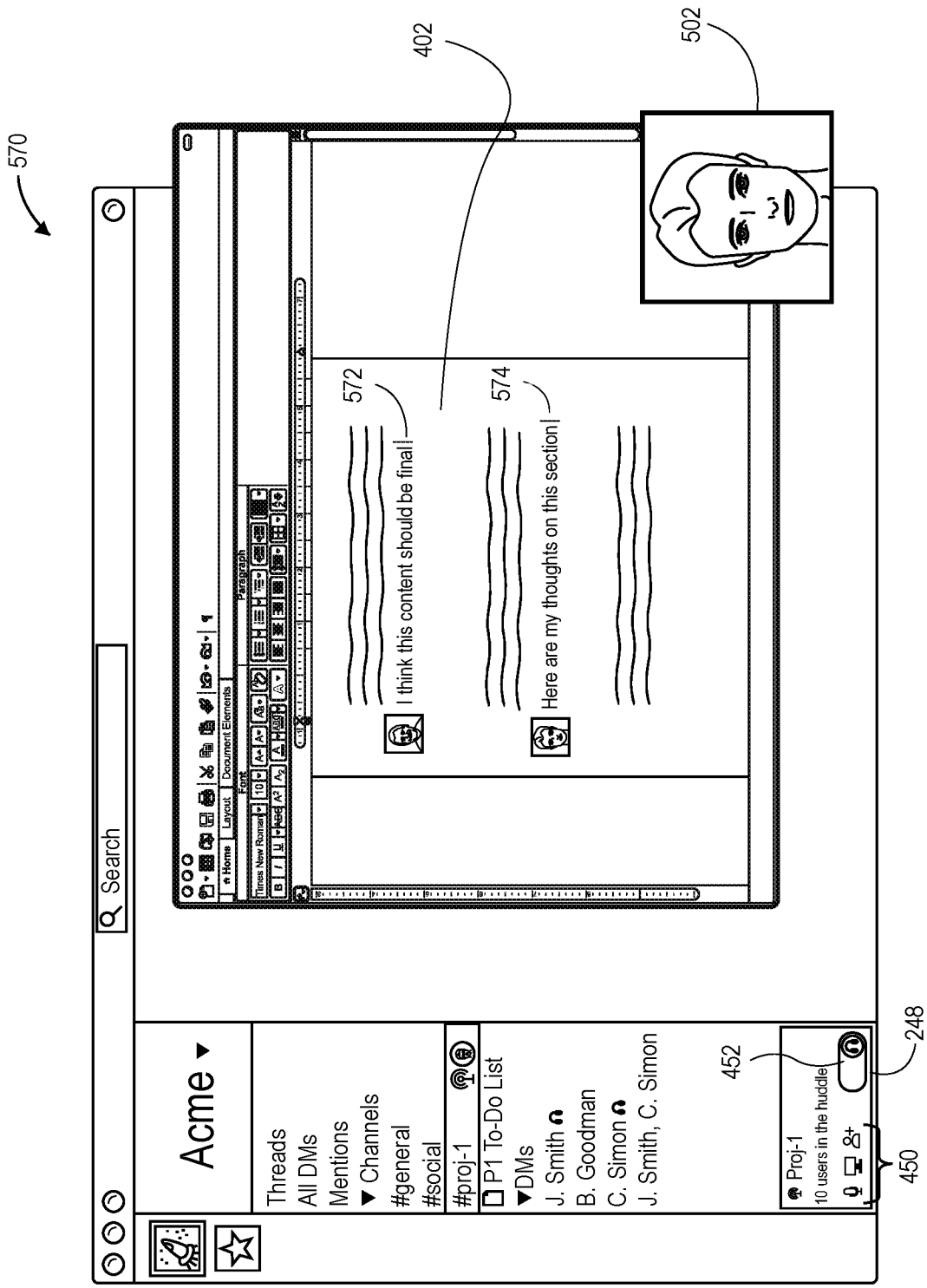
Figure 6:
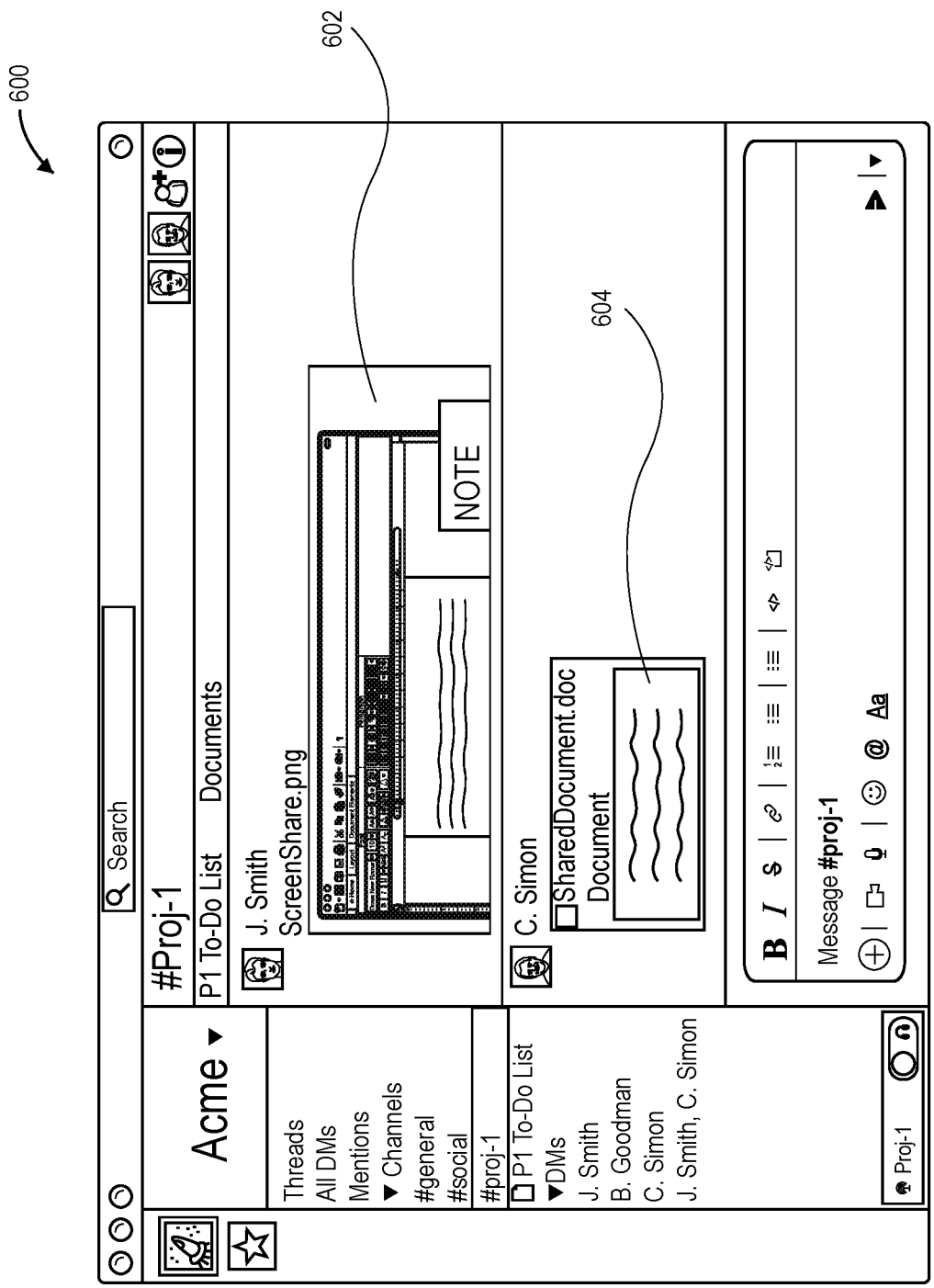

FIG. 5B depicts an exemplary embodiment of a screen sharing interface within a group-based communication system for a user to annotate a screen share FIG. 5C depicts an exemplary embodiment of a screen sharing interface within a group-based communication system for a user to collaborate via a screen share; and FIG. 6 depicts an exemplary embodiment of a user interface for the group-based communication system for persisting annotated screen shares.

The drawing figures do not limit the invention to the specific embodiments disclosed and described herein. The drawings are not necessarily to scale, emphasis instead being placed upon clearly illustrating the principles of the invention.

DETAILED DESCRIPTION

Context and Concepts of the Invention

As used herein, the term "group-based communication system" refers to a collaborative communication system used within an organization and is distinct from a conventional email system. In some embodiments, the group-based communication system is a channel-based platform. Within the group-based communication system, communication may be organized into "channels," each dedicated to a particular topic or set of users. Channels are generally long-lasting, persistent discussions of a particular topic. Members of a particular channel can post messages within that channel that are visible to other members of that channel together with other messages in that channel. Users may select a channel for viewing in order to see only those messages relevant to the topic of that channel without seeing messages posted in other channels on different topics. For example, a software development company may have different channels for each software product being developed, where developers working on each particular project can converse without bothering (or being bothered by) developers working on other projects. Because the channels are generally persistent and directed to a particular topic or group, users can quickly and easily refer back to previous communications for reference. Channels may be public such that anyone from within an organization can find the channel via search, join the channel, read posts in the channel, and contribute to the channel. Channels may also be private and invisible to all users who have not been explicitly added to the channel. In some embodiments, new users may be added to private channels only by invitation from an existing member of the channel. Channels may also be shared across organizations so that multiple separate companies can collaborate together. In some such embodiments, channels may have members from both participant organizations, and may be managed by a hosting organization of the two organizations.

In some embodiments, the group-based communication system may include synchronous multimedia collaboration sessions. Synchronous multimedia collaboration sessions may provide ambient, ad hoc multimedia collaboration in the group-based communication system. Users of the group-based communication system can quickly and easily join and leave these synchronous multimedia collaboration sessions at any time, without disrupting the synchronous multimedia collaboration session for other users. In some embodiments, synchronous multimedia collaboration sessions may be based around a particular topic, a particular channel, or a set of users, while in other embodiments, synchronous multimedia collaboration sessions may exist without being tied to any particular channel, topic or set of users. Synchronous multimedia collaboration sessions may be short, ephemeral sessions from which no data is persisted. Alternatively, in some embodiments, synchronous multimedia collaboration sessions may be recorded, transcribed, and/or summarized for later review. Members of a particular synchronous multimedia collaboration session can post messages within a messaging thread associated with that synchronous multimedia collaboration session that are visible to other members of that synchronous multimedia collaboration session together with other messages in that thread. The "multimedia" in a synchronous multimedia collaboration session may include any or all of audio, video, screen sharing, collaborative document editing, whiteboarding, co-programming or any other form of media. As discussed below, collaborative working may allow multiple users, applications, and integrations to edit a shared canvas, which may persist after the collaboration session. In such embodiments, permissions may be managed by the group-based communication system based on the context in which the shared canvas is created, accessed and/or shared. A synchronous multimedia collaboration session may be started for a particular channel or direct message conversation by one or more members of that channel or direct message conversation. For example, a user may start a synchronous multimedia collaboration session in a channel as a means of communicating with other members of that channel who are presently online. The user may have an urgent decision and want immediate verbal feedback from other members of the channel. Starting a synchronous multimedia collaboration session allows the user to start an immediate audio conversation with other members of the channel without requiring scheduling. Upon starting a synchronous multimedia collaboration session, other members of the channel may receive a notification alerting them that the synchronous multimedia collaboration session has begun. That notification may be a direct message, an alert, or an icon corresponding to the channel in which the synchronous multimedia collaboration session was initiated. A list of all active synchronous multimedia collaboration sessions may be provided to the users.

Communication data within a group-based communication system may include messages, queries, files (e.g., documents, spreadsheets, computer code, images, video, audio, and/or electronic contact information), mentions, users or user profiles, interactions (e.g., reactions, edits, deletions, and/or prioritizations such as by pinning or starring), tickets, channels, applications integrated into one or more channels, conversations (e.g., groups of messages that have been segmented as single units), workspaces (e.g., sets of channels, users, projects, tasks within an organization that may have their own sets of permissions and that may be organized substantially in line with an organization chart in some instances) or other data generated by or shared between users of the group-based communication system that are associated with an organization's communication data using the group-based communication system.

In some instances, the communication data may comprise data associated with a user (e.g., a user profile), including, but not limited to, a user identifier, one or more communication channel identifiers associated with communication channels to which the user has been granted access, one or more group identifiers for groups (or organizations, teams, entities, or the like) with which the user is associated, an indication of whether the user is an owner or manager of any communication channels, an indication of whether the user has any communication channel restrictions, a plurality of messages, a plurality of emoji, a plurality of conversations, a plurality of conversation topics, an avatar, an email address, a real name (e.g., Austin Author), a username (e.g., austin_a), a password, user preferences and/or settings, a time zone, a status, a token, and other user-specific information. In some embodiments, the group-based communication system may additionally or alternatively store permissions data associated with permissions of individual users of the group-based communication system. In some embodiments, permissions associated with an individual user can be mapped to, or otherwise associated with, an account or profile associated with user data. Permissions can indicate which users can communicate directly with other users, which channels a user is permitted to access, restrictions on individual channels, which workspaces the user is permitted to access, and restrictions on individual workspaces, for example. In some embodiments, the permissions can support the group-based communication system by maintaining security for limiting access to a defined group of users. In some such embodiments, such users can be defined by common access credentials, group identifiers, or other criteria, as described above.

In some embodiments, the group-based communication system can be partitioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. A workspace may comprise one or more channels that are unique to that workspace and/or one or more channels that are shared between one or more workspaces. In some embodiments, workspaces can be associated with one or more organization identifiers, which can be associated with organizations or other entities associated with the group-based communication system. In some embodiments, such data can be mapped to, or otherwise associated with, other types of data (e.g., user data, permission data, or channel data).

The subject matter of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments of the Invention

Figure 1A:
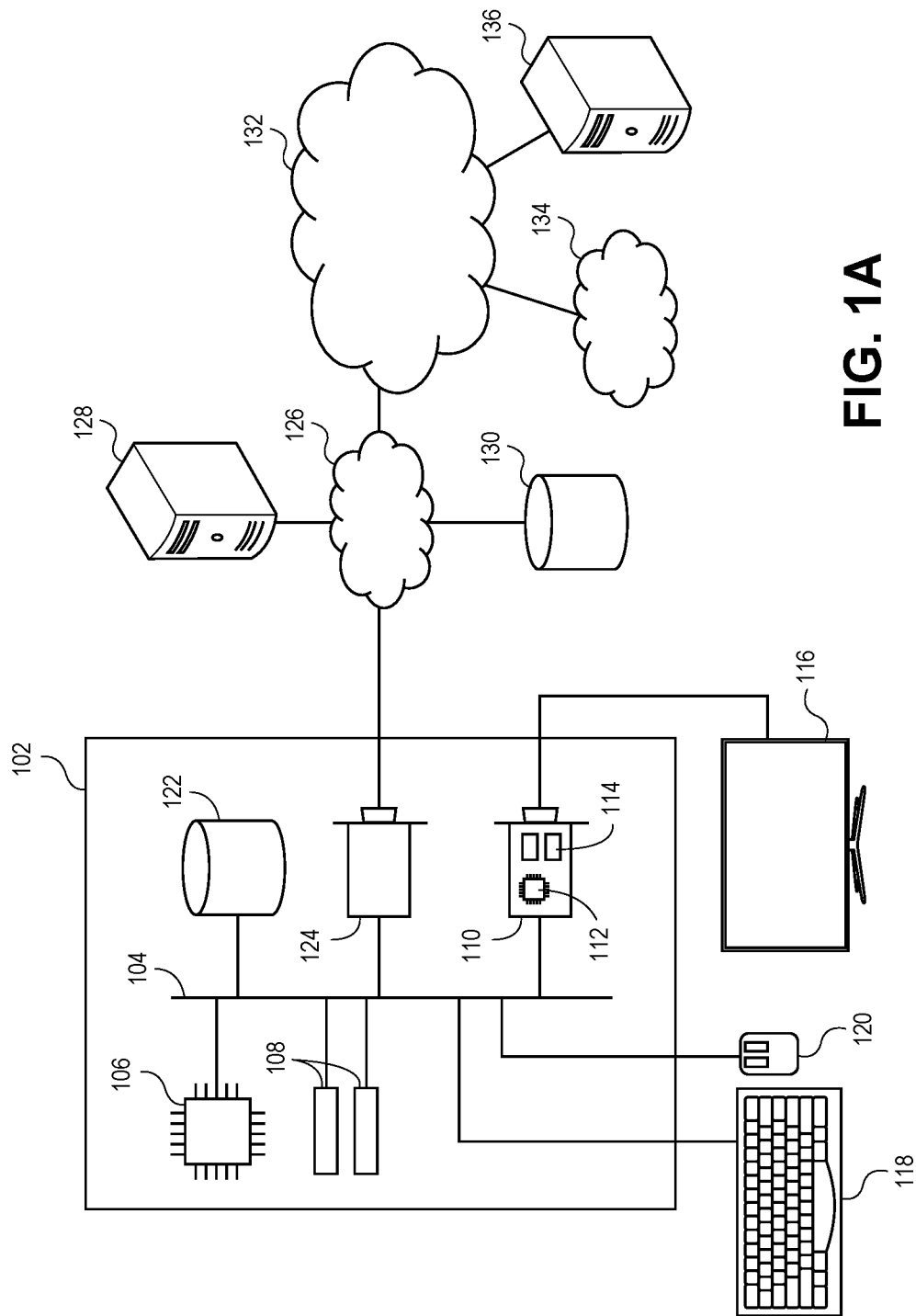
FIG. 1A depicts an exemplary hardware platform for certain embodiments of the invention.

FIG. 1A illustrates an exemplary hardware platform for certain embodiments of the invention. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple buses, or components may communicate with each other directly. System bus 104 is connected to central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. In some embodiments, additional peripherals such as a microphone or video camera may also be present and connected to system bus 104. In some embodiments, such peripherals may be detachable connected to computer 102 via a wired or wireless connection. In other embodiments, such as a tablet or smartphone, these peripherals are integrated into computer 102. Also connected to system bus 104 is local storage 122, which may be any form of computer-readable media and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, BLUETOOTH, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functionality for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 1B:
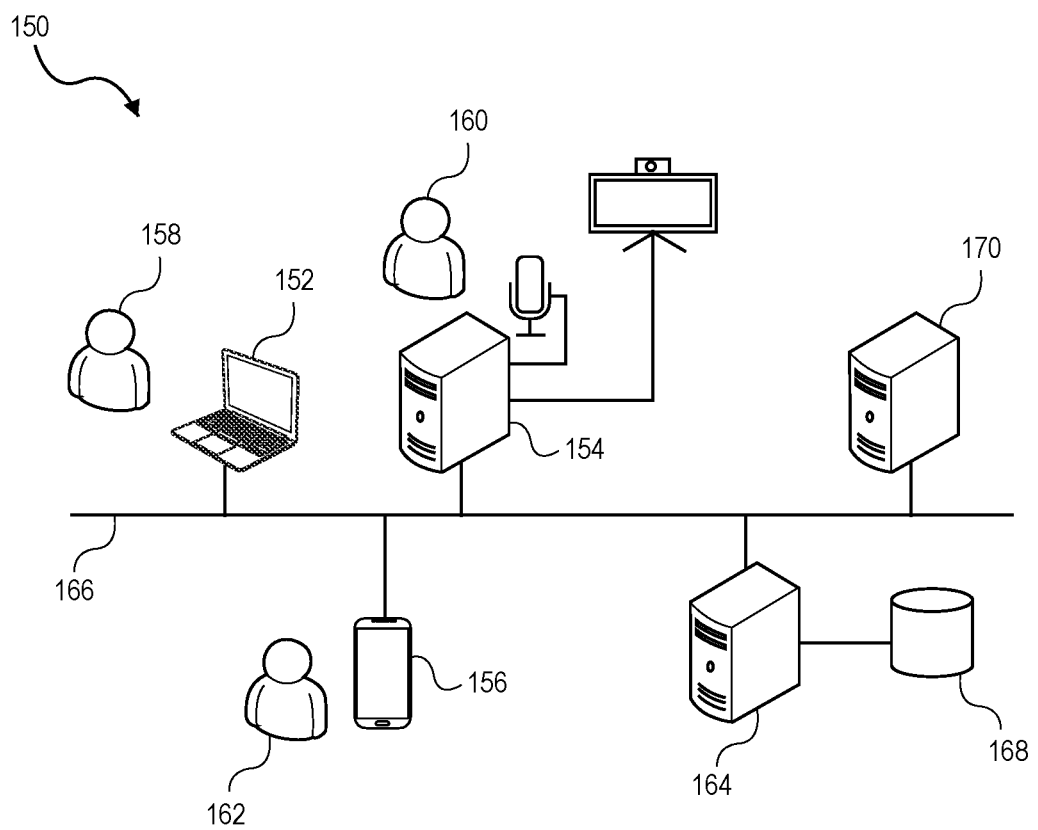
FIG. 1B depicts an exemplary diagram illustrating components of a system for carrying out embodiments of the invention.

FIG. 1B illustrates elements of a system 150 for carrying out embodiments of the invention. System 150 includes any number of client devices such as client device 152, client device 154, and client device 156 associated with user 158, user 160, and user 162 respectively. Although system 150 is depicted with one client device per user, an individual user may connect to the group-based communication system using multiple client devices, either concurrently or sequentially. Similarly, in some embodiments, multiple users may share (concurrently or sequentially) a single client device to access the group-based communication system. As depicted in FIG. 1B, client devices may be any form of computing device discussed above with respect to FIG. 1A. In particular, a user may access the group-based communication system using a desktop, a laptop, or a mobile device. The group-based communication system may be accessible via dedicated software of the client device or via the web browser of the client device. In some embodiments, channel administrators can access administrative functionality via any client device. In other embodiments, administrative functions can only be accessed from a limited subset of client devices (for example, only via client device 152). In some embodiments, the group-based communication system is a channel-based messaging platform.

The group-based communication system is hosted by group-based communication system server 164. Group-based communication system server 164 may be a dedicated server, a shared server, a virtual machine instance in a cloud computing environment, or any other form of computing device discussed above with respect to FIG. 1A. Although a single group-based communication system server 164 is depicted, embodiments with multiple such group-based communication system servers are also contemplated so as to provide scale, redundancy and/or isolation between different instances of the group-based communication system. For example, a software development company may not wish to have its group-based communications system hosted on the same server as a competitor's group-based communication system for security reasons. Group-based communication system server 164 is communicatively coupled to client devices 152, 154, and 156 via network 166. Network 166 may be a local area network (LAN), wide-area network (WAN), virtual private network (VPN) or the Internet. Broadly speaking, any type of network for providing communication between the various components of system 150 is contemplated. Group-based communication system server 164 may provide web server functionality to enable web-based clients and non-web server functionality to enable clients using a dedicated app. Alternatively, both web-based clients and dedicated-app clients might both use a single web server, or the web server might be a gateway providing web-based access to the dedicated-app server. Other techniques for enabling communication among various types of client application are also contemplated.

Group-based communication system data store 168 is communicatively connected to group-based communication system server 164. As depicted, group-based communication system data store 168 is directly connected to group-based communication system server 164; however, any form of communicative connection (for example, network-attached storage (NAS), a network file system (NFS), or cloud-based storage) can be employed. Broadly speaking, group-based communication system data store 168 stores all of the durable information used by group-based communication system server 164. For example, group-based communication system data store 168 may store all of the messages with their associated channels, documents and images uploaded to particular channels, channel membership information, and/or user information. In some embodiments, collaboration sessions may be archived and stored on the group-based communication system data store 168 for subsequent retrieval. As previously discussed, multiple group-based communication system servers may be present in system 150. In such embodiments, each group-based communication system server may have its own copy of group-based communication system data store 168. Alternatively, multiple group-based communication system servers may share a single network-attached group-based communication system data store. Alternatively, or in addition, in any of these embodiments, data may be sharded across multiple group-based communication system data stores.

Real-time media server 170 is also communicatively coupled to group-based communication system server 164 and client devices 152, 154 and 156. Real-time media server manages the multimedia aspects of real-time multimedia collaboration sessions among users of the group-based communication system as described in additional detail below. The term "multimedia" is used in this specification for brevity; however, it should be understood that the term used herein contemplates audio-only streams, video-only streams, audio/video streams, or any other combination of one or more media streams.

As depicted, the communication between real-time media server 170 is via network 166. In some embodiments, however, the real-time nature of collaboration sessions may be better served by connecting via a different network for part or all of the communicative coupling. For example, a particular client device may normally connect to group-based communication system server 164 via a cellular data connection but switch to a Wi-Fi connection when a multimedia collaboration session begins to accommodate an additional demand for bandwidth. In some embodiments, client devices may communicate multimedia collaboration data with each other via real-time media server 170 using a hub-and-spoke configuration. In other embodiments, client devices may communicate with each other directly using a peer-to-peer or supernode architecture. In still other embodiments, client devices on the same network may communicate with each other using multicast network protocols such as IP multicast. In yet other embodiments, media communication between the client devices may be via an edge-based scaling content distribution network.

Figure 2A:
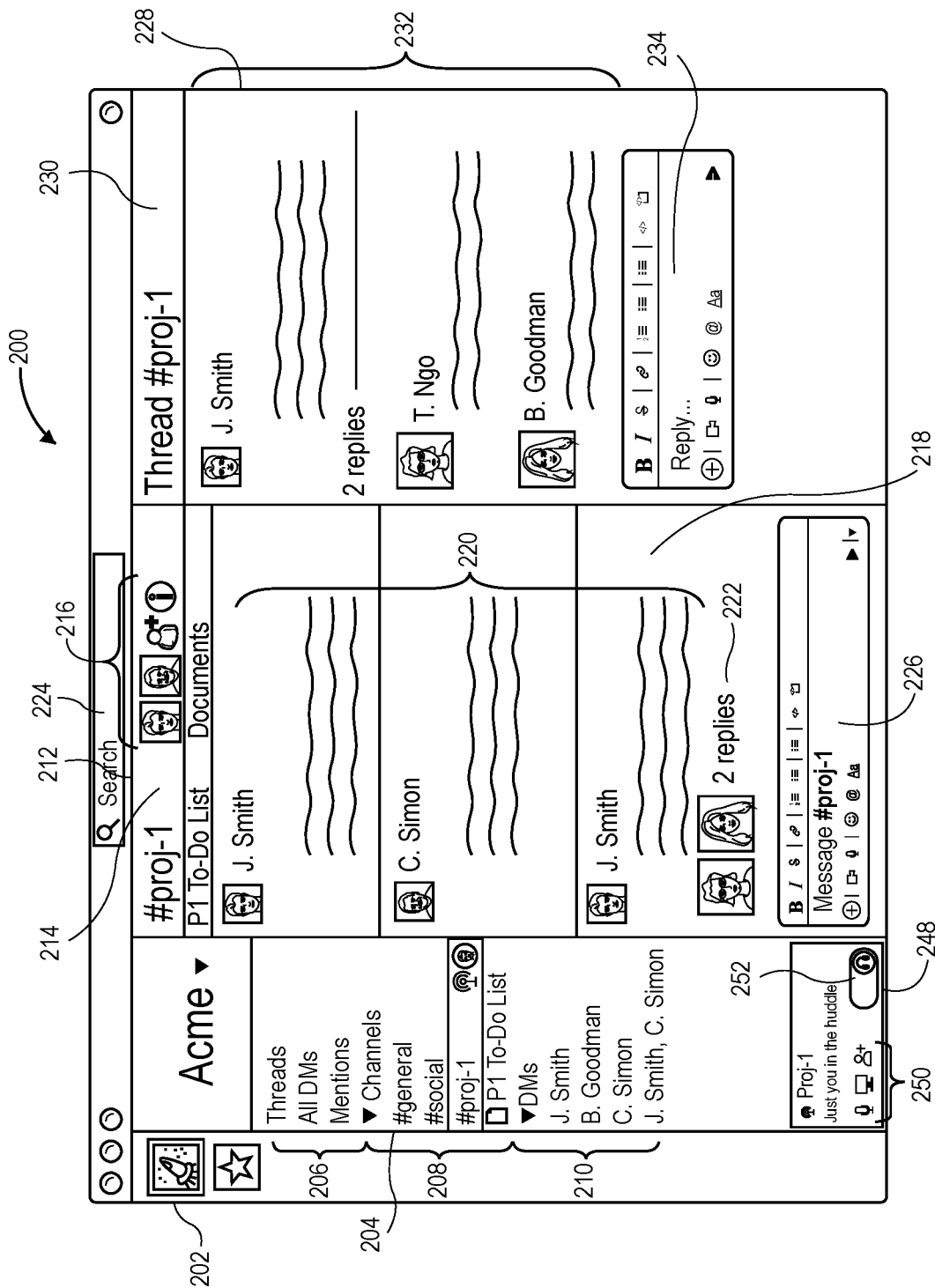
FIG. 2A illustrates a user interface for the group-based communication system for certain embodiments.

FIG. 2A illustrates a user interface 200 of a group-based communication system, which will be useful in illustrating the operation of various embodiments, as discussed in further detail below. Broadly, user interface 200 comprises a plurality of objects such as panes, text entry fields, buttons, messages, or other user interface components. As depicted, user interface 200 comprises workspace pane 202; channel list pane 204, which comprises quick info list 206, channel and document list 208 and direct message list 210; channel pane 212, which comprises channel header 214, channel controls 216, channel display 218, messages 220, and thread reply preview 222; search pane 224; compose pane 226; and thread pane 228.

As depicted, user interface 200 includes workspace pane 202 for navigating between various workspaces in the group-based communication system. In some embodiments, the group-based communication system can be portioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. For example, a user may be a part of a workspace for a job at Acme Software Engineering. The user may also be a member of a local volunteer organization that also uses the group-based communication system to collaborate. To navigate between the two groups, the user may use workspace pane 202 to change from the Acme workspace to the volunteer organization workspace. A workspace may comprise one or more channels that are unique to that workspace and/or one or more channels that are shared between one or more workspaces. For example, the Acme company may have a workspace for Acme Software Engineering projects, a workspace for Human Resources, and an additional workspace for general company matters. In some embodiments, workspaces can be associated with one or more organizations or other entities associated with the group-based communication system.

Users may navigate between channels using channel list pane 204. Channel list pane 204 may comprise quick info list 206 comprising various links for a user to quickly access portions of the group-based communication system. For example, as depicted, quick info list 206 comprises threads, Direct Messages (DMs), and mentions/reactions. Each of the items in quick info list 206 may be bolded, italicized, highlighted, boxed, animated, or otherwise called out to indicate the presence of unread items or items otherwise of interest. Clicking on the threads link in quick info list 206 may cause the display of all threads in which the user has participated, while clicking on the DMs list may cause the display in user interface 200 of all the direct messages in which the user is involved. Quick info list 206 may be configurable by the user to add various links to areas of the group-based communication system for quick access, such as a link to view all files shared within the group-based communication system. Channel list pane 204 may also comprise channel and document list 208 listing all channels and collaborative documents to which the user has subscribed to or to which the user has been granted access. In some embodiments, channel list pane 204 further includes direct message list 210. Direct message list 210 comprises a list of messages sent from a user directly to another user of the group-based communication system, which may be displayed in channel pane 212 when selected. Direct messages may be sent to one other user or to any number of users. In some embodiments, channel list pane 204 may include synchronous multimedia collaboration session pane 248. In some embodiments, the synchronous multimedia collaboration session will correspond to a channel or message that the user selected within channel list pane 204.

User interface 200 may further comprise channel pane 212 that displays information related to the currently displayed channel. In some embodiments, within the group-based communication system, communication may be organized into "channels," each channel dedicated to a particular topic or set of users. For example, Acme Software Engineering company utilizing the group-based communication system may have a channel #general to discuss general company matters and a #proj-1 channel to discuss a live project. Teams within the software engineering firm may have their own channels as well, such as a #devops channel for a DevOps team. Members of a particular channel can post messages within that channel that are visible to other members of that channel together with other messages in that channel. In some embodiments, or for certain selected channels, messages may be visible only to channel members; in other embodiments or for other channels, non-members of a channel may be able to preview messages in a channel without joining. Users may select a channel for viewing in order to see only those messages relevant to the topic of that channel without seeing messages posted in other channels on different topics.

Channel pane 212 may also include channel header 214, which may display metadata for the currently selected channel, including channel name, channel membership, and channel topic. Channel header 214 may also display channel controls 216 for viewing members of the channel, inviting a new member to the channel, viewing information about the channel, or other channel-related functions. User interface 200 may also include search pane 224. Search pane 224 may allow users to search for content located in the current workspace of the group-based communication system, such as files, messages, channels, members, commands, functions, and the like.

As previously mentioned, channel pane 212 may also include compose pane 226. Compose pane 226 allows users to compose and transmit messages to the members of the channel. Compose pane 226 may have text editing functions such as bold, strikethrough, and italicize. Compose pane 226 may also allow users to format their messages or attach files such as, but not limited to, collaborative documents, images, videos, or any other files to share the file or files with other members of the channel. Compose pane 226 may also permit users to mention collaborative documents to automatically share those collaborative documents.

In some embodiments, conversations in channels may further be broken out into threads. Threads may be used to aggregate messages related to a particular conversation together to make the conversation easier to follow and reply to. For example, a user, J. Smith, in the channel #proj-1 may ask a question pertaining to a specific company policy. Another member of the channel may decide to reply to J. Smith in a thread to keep the conversation grouped together and to keep the response from getting lost in the channel. Under the message to which a user has replied appears thread reply preview 222. Thread reply preview 222 may show information related to the thread, such as, for example, the number of replies and the members who have replied. Thread replies may appear in thread pane 228 that may be separate from channel display 218 in channel pane 212 and may be viewed by other members of the channel by selecting thread reply preview 222 in channel display 218.

In some embodiments, thread pane 228 comprises thread header 230 that may display the channel the thread is associated with. Thread pane 228 also may include scrollable thread display 232 that displays each message sent in the history of the thread. Users participating in the thread may also reply directly to the thread using thread compose pane 234. Thread compose pane 234 may be positioned within thread pane 228 where a user can compose and transmit a reply to the messages in the thread. In some embodiments, thread compose pane 234 shares the features of compose pane 226. In further embodiments, thread pane 228 may be used for comments within collaborative documents. For example, users who wish to add comments in a collaborative document may do so by selecting an icon from within the collaborative document to launch thread pane 228. Thread pane 228 may then permit the user to add comments within the document which will be displayed in thread pane 228. In some embodiments, individual sections within collaborative documents may have their own thread pane 228. In further embodiments, the icons within the collaborative document corresponding to sections may change based on if there are any comments associated with the section. In this way, sections of collaborative documents can be interacted with in any of the ways described herein with respect to group-based communication system messages.

Figure 2B:
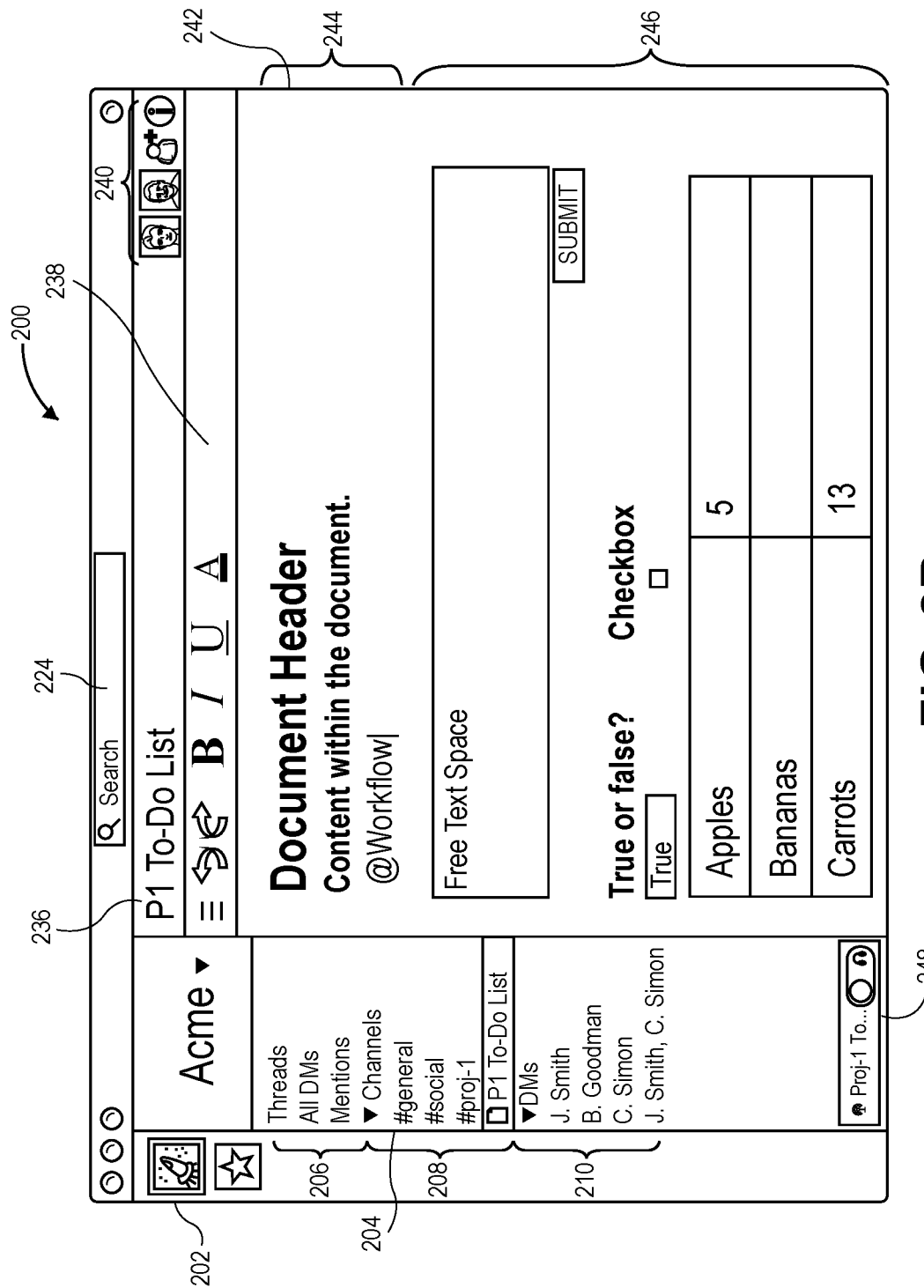
FIG. 2B depicts an exemplary embodiment of a user interface for the group-based communication system for displaying a collaborative document.

FIG. 2B, by contrast, illustrates user interface 200 when the user is displaying only a collaborative document instead of channel information. Where common features or elements are unchanged, they are not discussed separately from their description with respect to FIG. 2A. As illustrated, channel pane 212 and thread pane 228 have been replaced with document pane 236. In some embodiments, document pane 236 may be displayed alongside any other pane, such as channel pane 212. In some embodiments, within the group-based communication system, collaborative documents may be modified and edited by one or more users. Users with the appropriate permissions and access can view, edit, or comment on the collaborative documents. Document pane 236 may comprise document toolbar 238, document controls 240, and document display 242. Document display 242 may display all of the content within the collaborative document including unstructured sections 244 and structured sections 246. The functionality of document pane 236 may be provided by the group-based communication system or by a third-party integration. Although a collaborative document focused on word-processing is depicted in document pane 236, any type of collaborative document is contemplated for use with the invention, including spreadsheet editing, multimedia editing, image editing, and code editing. In some embodiments, collaborative documents may be text-based documents. In other embodiments, collaborative documents may include other document types, forms, and features. For example, documents may incorporate spreadsheet, database, and/or presentation functionality, including the use of programmatic functions that can interact with group-based communication system objects. Similarly, documents may integrate workflow features such that users can collaboratively complete a workflow by filling out sections of a document. In some embodiments, documents may be persisted via a group-based communication data system data store or via a group-based communication system data table. In some examples, some types of document-editing features may be provided by a different third-party integration. Users can switch the currently displayed collaborative document to either another collaborative document, a channel, or a direct message by selecting another item in channel list pane 204.

Document pane 236 may include document toolbar 238, which may display icons and menus which allow for the formatting of a collaborative document. For example, document toolbar 238 may provide a user the ability to bold, italicize, or underline fonts. In some embodiments, document toolbar 238 may provide users the ability to undo and redo actions. In further embodiments, document toolbar 238 may allow a user to modify the color of text. In still further embodiments, document toolbar 238 may allow a user to insert images, tables, and/or workflows. Document pane 236 may also display metadata for the currently selected collaborative document, including document name. Document pane 236 may also include document controls 240 for viewing members with access to the collaborative document, inviting a new member to access the collaborative document, viewing information about the collaborative document, or other document-related functions. For example, document controls 240 may display icons indicating which users are actively viewing the collaborative document. In some embodiments, document pane 236 may display a workflow status which indicates which workflow step the workflow is currently on. For example, a workflow status may show that the collaborative document is currently in the process of an approval workflow step and the collaborative document is awaiting approval from a specific user. In further embodiments, the workflow status may show a summary of information within the collaborative document. For example, the collaborative document may include a table for users to insert their shirt size, and the workflow status may include a summary of the number of shirts of each size that were entered into the table. As described elsewhere, users may interact with documents in any way they can interact with a group-based communication system message. For example, Users may mention other users (for example, by adding their username preceded by a special tag such as "@") to notify them of content requiring their attention in a document. For example, a user may determine that input or feedback form another user is required in a document. By mentioning that user in the document, the second user may be notified and automatically granted permissions. Similarly, users can reference group-based communication system channels and other collaborative documents to share content with other users viewing or editing the collaborative document. In some embodiments, mentioning users, channels, or other collaborative documents from within a collaborative document may appropriately adjust the permissions for one or more channels or documents to allow users to interact with them seamlessly.

Document display 242 may display the selected collaborative document if the viewing user has sufficient permissions (e.g., a view permission). In some embodiments, a user of the group-based communication system may edit the collaborative document if they have sufficient permissions (e.g., an edit permission). In further embodiments, a user of the group-based communication system may leave comments on the collaborative document (e.g., a comment permission). As described below, permissions may be automatically assigned to collaborative documents based on, for example, the context of creation. In some embodiments, collaborative documents may comprise free-form unstructured sections 244 and workflow-related structured sections 246. In some such embodiments, sections may have individual permissions associated with them. In some embodiments, unstructured sections 244 may include areas of the collaborative document in which a user can freely modify the collaborative document without any constraints. For example, a user may be able to freely type text to explain the purpose of the collaborative document. In some embodiments, a user may add a workflow or a structured workflow section by typing the name of (or otherwise mentioning) the workflow. In further embodiments, typing the at sign or a previously selected symbol or a previously determined special character or symbol may provide the user with a list of workflows which the user can select to add to the collaborative document. For example, a user may realize that a marketing team may need to sign off on a proposal and type "!Marketing Approval" to initiate a workflow which culminates in a member of the marketing team approving the proposal. Users may also mention users or channels from within collaborative documents to automatically share the documents with those users or channels. In some embodiments, structured sections 246 may include text entry, selection menus, tables, checkboxes, tasks, calendar events, or any other document section. In further embodiments, structured sections may include text entry spaces which are a part of a workflow. For example, a user may enter text into a text entry space detailing a reason for approval, and then select a submit button which will advance the workflow to the next step of the workflow. In some embodiments, the user may be able to add, edit, or remove structured sections of the collaborative document that make up the workflow components.

Figure 3:
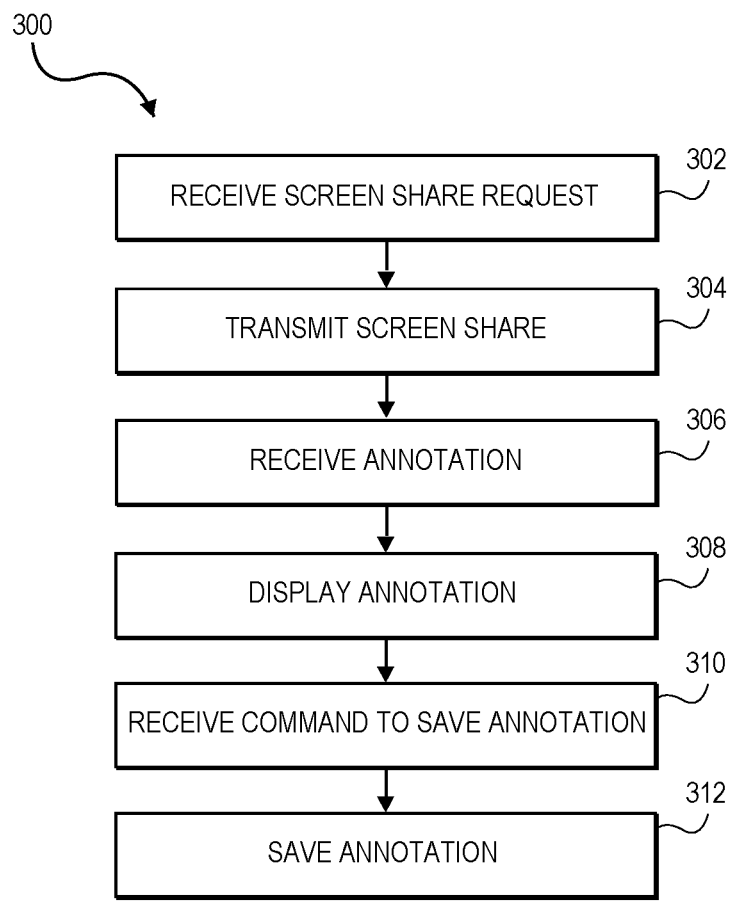
FIG. 3 depicts an exemplary method for persisting annotated screen shares for certain embodiments.

FIG. 3 illustrates an exemplary method 300 for persisting annotated screen shares for certain embodiments. At step 302, a screen share request is received. A screen share request may be an indication that a user within a group-based communication system desires to share their screen. In some embodiments, the screen share request may be associated with a virtual space. For example, a software company may have a project channel dedicated to a new software product. Members of the project channel may have started a synchronous multimedia collaboration session from within the project channel to discuss plans for the upcoming development cycle. A software development manager in the synchronous multimedia collaboration session may wish to share their screen to show the other attendees a list of the planned features for the next development cycle. In some embodiments, a screen share request may be initiated by a user of the group-based communication system selecting a share screen option from a list of synchronous multimedia collaboration session controls 450 of FIG. 4A. A screen share request may comprise a selection of which screen, window, or file a user would like to share. For example, a user with multiple monitors may have multiple screens available to select and may provide an indication of which screen the user would like to share. As another example, a user may currently have both a presentation and a text file open on their computer and indicate in the screen share request which window the user would like to include in the screen share, without sharing other windows which may contain private information. In some embodiments, only permitted users may be able to share their screen in certain virtual spaces. Some virtual spaces may permit only certain users to share their screen. For example, a creating user who starts a synchronous multimedia collaboration session may indicate that only the creating user should be permitted to screen share. As another example, a synchronous multimedia collaboration session associated with a development channel may only permit screen shares from users who are members of a separate management channel. In some embodiments, if a user elects to screen share a file, a local copy of the file may additionally be provided to all viewing users. This may permit viewing users to easily refer to portions of the file other than what the screen sharing user is currently looking at and sharing. In some embodiments, the copy of the file may be stored within (or imported into) the group-based communication system to permit native versions of the annotated screen share.

In some embodiments, the group-based communication system may send a notification to one or more users that a screen share has been initiated. The notification may be sent to users in one or more virtual spaces associated with the screen share. For example, if a software development manager in a synchronous multimedia collaboration session has initiated a screen share session, a notification may be sent both to users who are currently in the synchronous multimedia collaboration session as well as users who have permission to join the synchronous multimedia collaboration session, such as users who are members of the channel from which the synchronous multimedia collaboration session started. In some embodiments, the notification may include information on the user sharing their screen, the virtual space where the screen is being shared, information on what is being shared, and information on the timing of the screen share and/or virtual space. For example, a notification may indicate that J. Smith, a manager, is sharing a file called "Development Plan" in a synchronous multimedia collaboration session which was initiated in the "Development" channel and began five minutes ago. In other embodiments, no notification is sent, but (as described below) other participants in the virtual space are automatically able to view the shared screen.

At step 304, the screen share is transmitted to another user, allowing them to view the screen share. The screen share may be displayed as a pane within the group-based communication system, in a separate window, or as a full screen display. In some embodiments, a video of the user currently sharing their screen may be transmitted along with the shared screen. For example, the corner of the screen may depict a video of the user as they discuss the screen share. In some embodiments, a toolbar containing annotation tools may be transmitted to viewing users. The toolbar may also act as a way for viewing users to initiate the saving process for saving annotated screen shares.

In some embodiments, a viewing user may request to view the screen share before it is transmitted to their display. In some such embodiments, this request is automatically sent responsive to the initiation of screen sharing. In other such embodiments, a user who wishes to view the screen can select a control in synchronous multimedia collaboration session controls 450 of FIG. 4A to send the request and begin viewing the shared screen. In still other such embodiments, a request to view the screen share may correspond to a request to join a virtual space which has an active screen share. For example, a user may select an option to join an in-progress synchronous multimedia collaboration session after receiving a notification that J. Smith has begun sharing his screen. In other such embodiments, a request to view the screen share may occur automatically when a user joins a virtual space in which a screen share session is ongoing or is initiated.

At step 306, annotations for the screen share are received. Broadly, and as described in greater detail below, screen share annotations may be any type of content overlay layer to be displayed over the screen share. In some embodiments, a screen share annotation may be content displayed on top of the screen share. In other embodiments, a screen share annotation layer may be partially or wholly transparent. For example, a user may add a sticky note on top of the display with editable text to leave a note. The sticky note may include an indication of the time the sticky note was added and which user added the sticky note. As another example, a user may add any text, image, video, file, or group-based communication system object on top of a screen share. In some embodiments, selecting the annotation may link a user to the content. For example, a user may include a group-based communication system channel as an annotation and selecting the channel may link the selecting user to the channel. In some embodiments, a screen share annotation may include selecting a portion of the screen to highlight. For example, selecting a portion of text on the screen may highlight the text in yellow. As another example, selecting a rectangular or circular portion of the screen may gray out all of the screen outside of the rectangular or circular portion to provide emphasis on only the selected portion of the screen. Any type of annotation which enables a user to draw on, mark up, or otherwise add content over a screen share is contemplated.

In some embodiments, the annotations may require approval before they are transmitted to other users for display. For example, the annotations may be sent to the screen sharing user to allow the screen sharing user to decide whether or not the annotations should be used as an overlay for other viewing users. In some embodiments, the screen sharing user may instead designate another user within the group-based communication system to provide approval. For example, a screen sharing user may be sharing their screen during a presentation and be too busy giving the presentation to deal with suggested annotations. Delegating the annotation approval provides the benefits of approval for annotated screen shares while still allowing the screen sharing user to fully focus on the presentation. In some embodiments, local or private annotations may exist only for the user submitting the annotation. For example, a user may wish to take notes during a screen share for personal use. If the annotations are for personal use, the annotations may not be transmitted to other users. In some embodiments, the screen sharing user may disable approvals so that all annotations are automatically permitted. In other embodiments, the sharing user may automatically deny all annotations such that all annotation requests are denied. In some such embodiments, local or private annotations may be permitted even where annotation sharing is denied for a given user or globally.

At step 308, the annotation is displayed as an overlay on the screen share to other users viewing the screen share. Users may toggle annotations on or off, either individually or as a whole. For example, a user may not want to see a particular annotation and so the user may choose to delete or otherwise disable the annotation. In some embodiments, certain annotations may be edited by the original annotating user or by other users after display. For example, a first user may submit a sticky note annotation including text, and the text may be later modified by a second user. Annotations may include information regarding which user submitted it, which user last edited it, and when the annotation was created or last edited.

At step 310, a request to save the annotations from the screen share is received. In some embodiments, the annotation is automatically persisted in the virtual space in which the screen share took place (for example, with the synchronous multimedia collaboration session). In other embodiments, the save request comprises a save type and a save location. A save location is where the annotated screen share is to be saved. In some embodiments, annotated screen shares may be saved either locally or within the group-based communication system. For example, a user may wish to download the annotated screen share to her local computer to later use outside of the group-based communication system. As another example, a user may wish to immediately share the annotated screen share to the virtual space corresponding to the synchronous multimedia collaboration session for the benefit of members of the virtual space not present in the synchronous multimedia collaboration session. In some embodiments, any screen share saved may be automatically persisted to a virtual space corresponding to the synchronous multimedia collaboration session without user interaction. Annotated screen shares may be saved as images, videos, metadata, or as modifications to native files. For example, in the case of an image, an annotated screen share may be an exact copy of the sharing user's screen, including any annotations, at the time a viewing user submitted a save request. Similarly, in some embodiments, a save request may prompt the viewing user to select a portion of time to save, which may save a video clip of the screen share including the annotations. In further embodiments, an annotated screen share may be saved as metadata. For example, the annotations may be stored without the underlying screen share (or separately in association with the underlying screen share) or any related file such that the annotations can later be combined with the underlying screen share or related file to recreate the annotated screen share. In still other embodiments, annotations may be stored natively in files. For example, certain file types may permit comments, drawings, or other specific annotations with native functionality. A text document format may provide for comment functionality and annotations may be stored directly within the file, allowing for annotated screen shares to persist as new versions of shared files. The native annotated screen share may then exist as a native file which includes annotation data within the file itself.

At step 312, the annotations are saved. In some embodiments, any annotated screen share will be saved to the synchronous multimedia collaboration session, which may in term persist the annotated screen share within an associated channel. For example, any saved annotated screen share may automatically be posted as an image within the project channel if any user saves an annotated screen share during a synchronous multimedia collaboration session associated with the project channel. In some embodiments, the saving user must specify that they would like to post the annotated screen share within the channel. A saving user may specify multiple locations to save the annotated screen share, for example saving a local copy as well as posting with a channel. In some embodiments, all the saved annotated screen shares from a synchronous multimedia collaboration session may be stored together in a container and posted within the corresponding channel at the conclusion of the synchronous multimedia collaboration session.

Figure 4A:
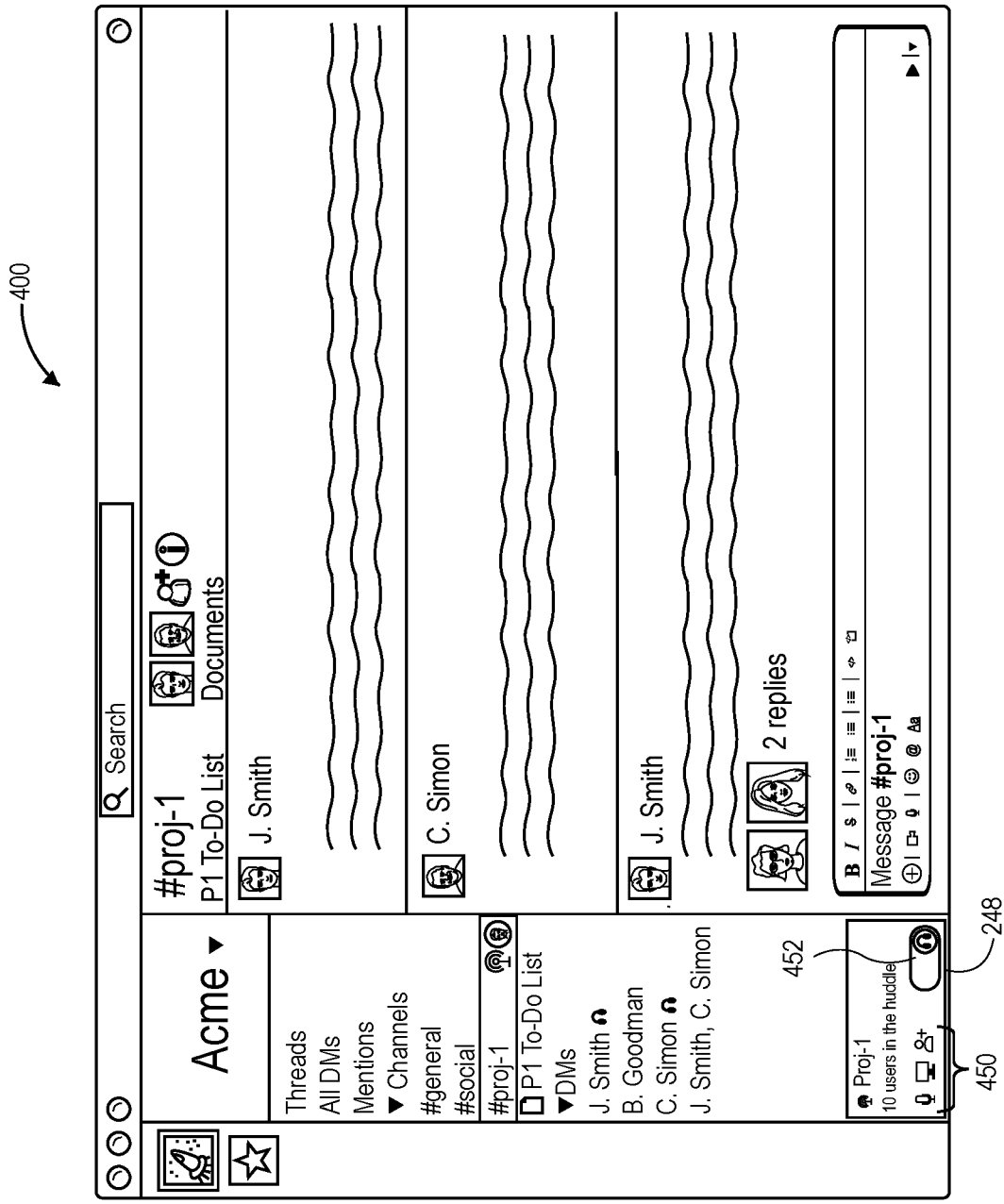
FIG. 4A depicts an exemplary embodiment of a group-based communication system screen sharing interface for a user sharing their screen prior to the initiation of screen sharing.
Figure 4B:
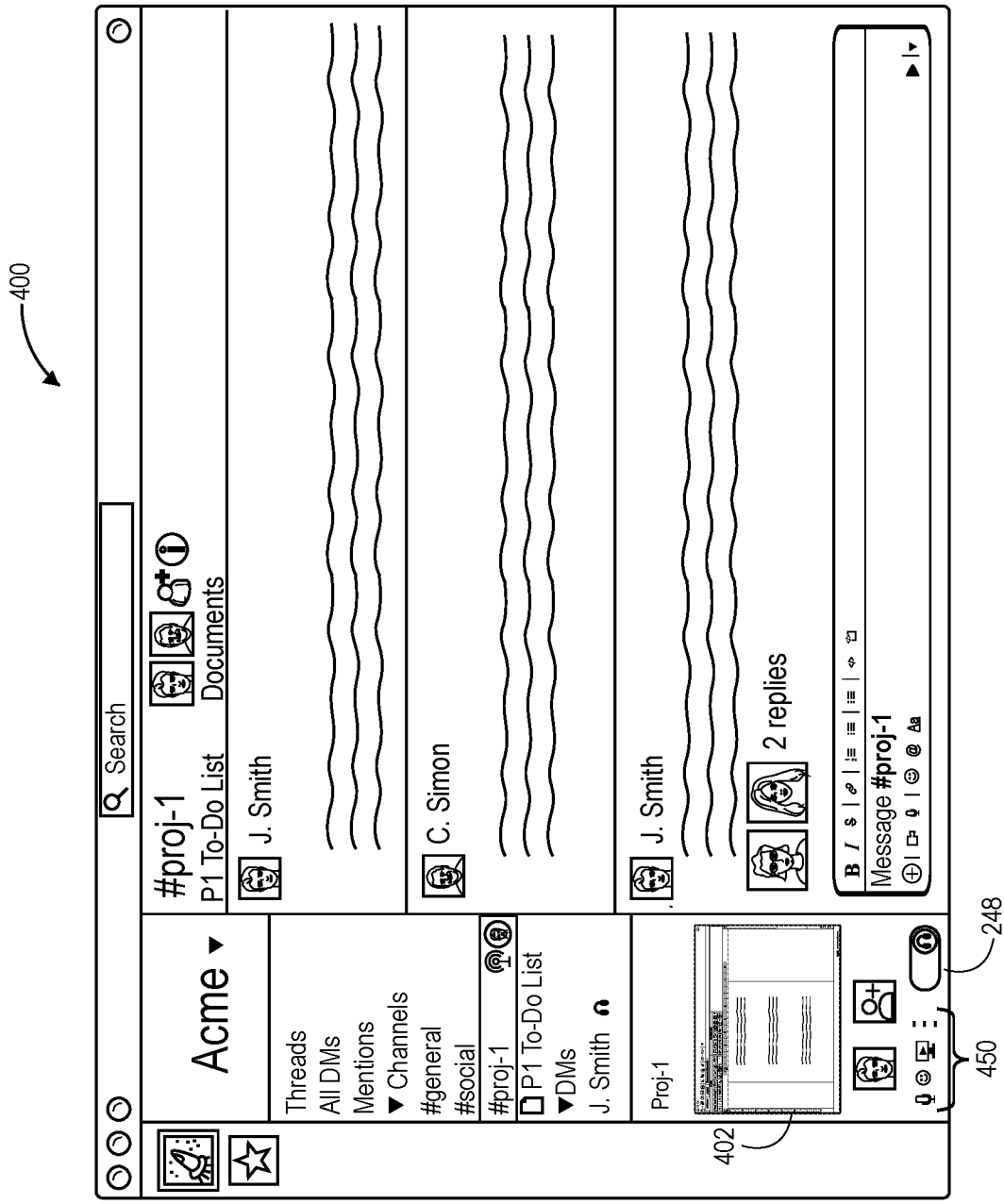
FIG. 4B depicts an exemplary embodiment of a group-based communication system screen sharing interface for a user sharing their screen while screen sharing is ongoing.
Figure 4C:
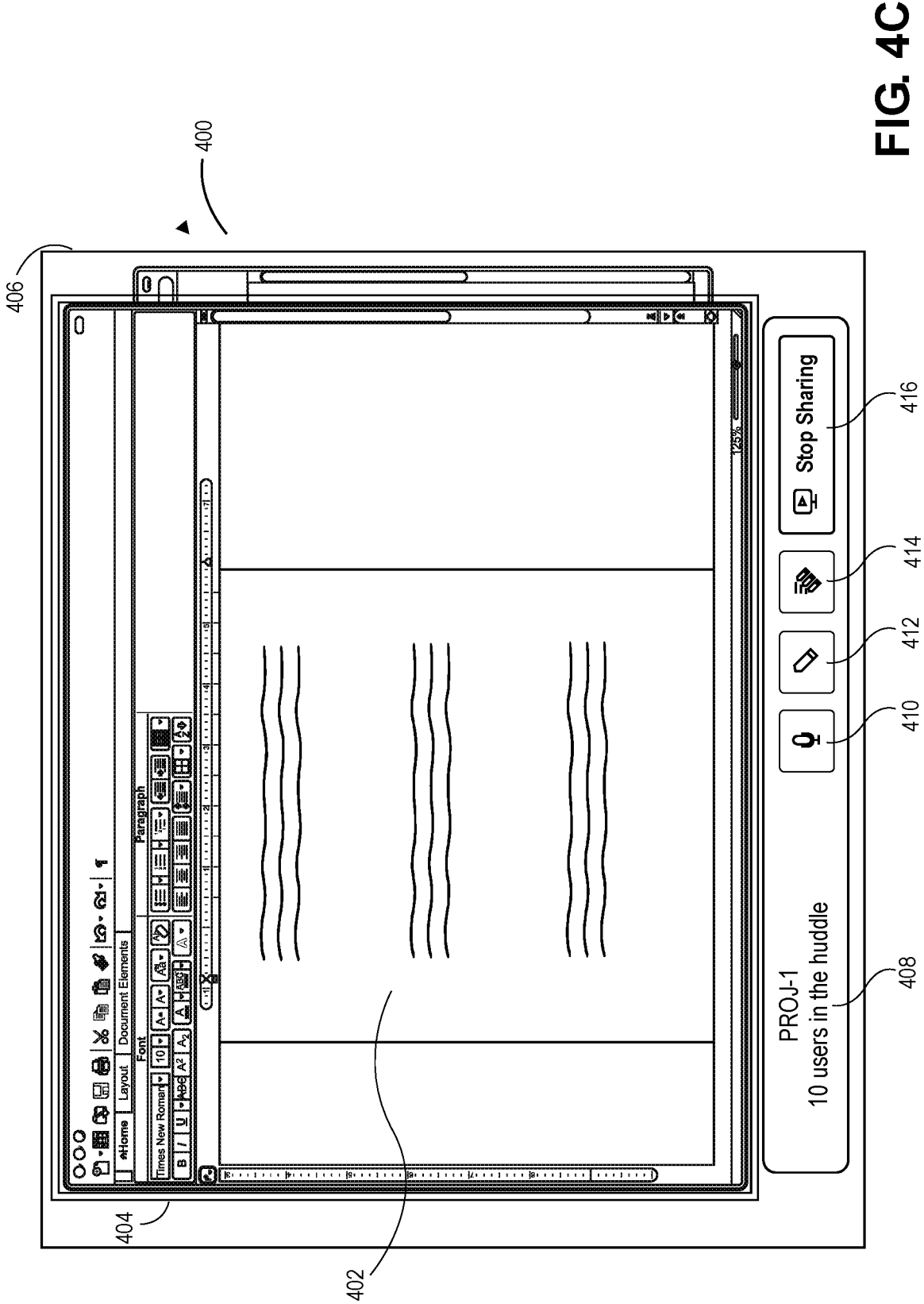
FIG. 4C depicts an exemplary embodiment of a desktop being shared by a group-based communication system screen sharing interface for a user sharing their screen.

FIGS. 4A-4C depict an exemplary user interface 400 for a screen sharing user who has elected to share their entire screen. Initially, as depicted in FIG. 4A, a plurality of users are participating in a synchronous multimedia collaboration session. For example, as depicted, the user whose group-based communication system user interface is depicted has utilized toggle 452 to join the synchronous multimedia collaboration session, and synchronous multimedia collaboration session pane 248 is updated to reflect the current state of the synchronous multimedia collaboration session.

During an ongoing synchronous multimedia collaboration session, synchronous multimedia collaboration session pane 248 may comprise synchronous multimedia collaboration session controls 450 and synchronous multimedia collaboration session toggle 452 may reflect whether the user is currently joined to the synchronous multimedia collaboration session. In some embodiments, synchronous multimedia collaboration session pane 248 may display information on which users are participating in a synchronous multimedia collaboration session. Synchronous multimedia collaboration session controls 450 allow a user to mute or unmute, share a screen, and invite other users into the synchronous multimedia collaboration session. In some embodiments, a user selecting to mute during a synchronous multimedia collaboration session may provide the user with an option of providing background music. Users can leave or join a synchronous multimedia collaboration session by actuating synchronous multimedia collaboration session toggle 452.

At this point, the user elects to share their screen using synchronous multimedia collaboration session controls 450. The screen sharing user may elect to share either one or more screens, to share one or more windows visible within the screens, or to share one or more files individually. For example, a user may select to only share one particular window or file as the user may be worried about accidentally sharing other information visible on the desktop.

Once the user has elected to share their screen, the group-based communication system interface 400 is updated to reflect the ongoing screen-share session and is reflected in FIG. 4B. As shown in FIG. 4B, synchronous multimedia collaboration session pane 248 may be expanded, and a preview tile of the shared screen window 402 may be included therein, allowing the sharing user to see at a glance that a window (and which window) is being shared in the synchronous multimedia collaboration session. Similarly, the share screen control of synchronous multimedia collaboration session controls 450 may be of a different color, may be highlighted, or may otherwise change appearance to reflect the ongoing screen share, and an additional menu may be included in synchronous multimedia collaboration session controls 450 to allow the sharing use to adjust the parameters for the shared window.

FIG. 4C illustrates a full screen view of the shared screen displaying a user's full desktop 406, some or all of which is being shared, as would be seen by the screen sharing user. As depicted in FIG. 4B, only a single window 402 of the sharing user's desktop 406 is shared. Alternatively, however, the sharing user may elect to share their full screen, in which case the user's full visible desktop 406 may be displayed to other users. In some embodiments, visible desktop 406 may show any files which appear within the screen. Sharing border 404 may alert the screen sharing user as to what is currently being shared. In some embodiments, sharing border 404 may be a bright color such that it is easily perceptible to the user. If a user elects to share a single window or file, sharing border 404 may border the window in the desktop, as shown. Alternatively, if the user elects to share their entire desktop, sharing border 404 may instead border the entire visible desktop 406. As depicted in FIG. 4C, visible window 402 depicts a window (or individual file) that is being shared within visible desktop 402. Broadly speaking, visible window 402 may be any file, folder, application, or program which a screen sharing user can view within visible desktop 402.

Sharing toolbar 408 may appear on desktop 406 to the screen sharing user while the user is actively sharing their screen. Sharing toolbar 408 provides the user with helpful tools as a presenter. Sharing toolbar 408 may display information about the ongoing synchronous multimedia collaboration session such as which channel the synchronous multimedia collaboration session is associated with and how many users are currently viewing the shared screen. Sharing toolbar 408 may comprise microphone control 410 which permits the screen sharing user to mute and unmute their microphone. Sharing toolbar 408 may comprise annotation control 412 which permits the screen sharing user themselves to annotate the screen share. When actuated, annotation control 412 may cause annotation toolbar 552 of FIG. 5B to be displayed instead of or in addition to sharing toolbar 408. Annotation toolbar 552 of FIG. 5B is discussed in greater detail with respect to FIG. 5B; however, embodiments of the invention contemplate both the screen sharing user and the viewing user annotating the shared screen, either privately, individually, concurrently, or collaboratively. In some embodiments, different types of annotation tools may be available for different users. For example, the screen-sharing user may have more, different, or fewer annotation tools than a viewing user. In some embodiments, the screen sharing user may have different annotation options than the viewing user. As described below with respect to annotation toolbar 552 of FIG. 5B, one or more highlight tools may be available to emphasize certain portions of the screen during the screen share session and certain of these tools may be available only to the screen sharing user. For example, a screen sharing user may have a laser pointer feature which allows the user to emphasize a point of the screen without anything persisting, while viewing users may have access to more, fewer, or different tools. In some embodiments, sharing toolbar 408 may comprise annotation permission control 414 which allows the sharing user to determine who can add annotations. In some embodiments, annotation permission control 414 may be a toggle which allows either all users or no users to add annotations. In further embodiments, annotation permission control 414 may allow a user to select specific users and/or specific annotations which the user would like to permit. For example, a sharing user may wish to permit only a subset of users to add sticky notes, but allow all users to draw on the screen share. A screen sharing user may also use annotation permission control 414 to delegate the responsibility for managing annotations to another user. Sharing toolbar 408 may also comprise stop sharing button 416 which ends the screen share. In some embodiments, stop sharing button 416 may also provide a user the option to end the synchronous multimedia collaboration session. Stop sharing button 416 may optionally allow the screen sharing user to select a different user to begin sharing their screen. In some embodiments, sharing toolbar 408 may also comprise an option which allows the screen sharing user to turn on or off their video, which may optionally be displayed along with the screen share. Sharing toolbar 408 may also comprise additional presentation tools which allow the sharing user to control which viewing users can speak. In some embodiments, sharing toolbar 408 may allow a user to temporarily share a blank or black screen. For example, a user may wish to momentarily cover their screen to hide confidential information such as a password being entered. In further embodiments, a sharing user may elect to hide a portion of their screen permanently. The screen sharing user may also elect to save annotated screen shares intermittently, at predetermined intervals, or at the conclusion of the synchronous multimedia collaboration session.

In some embodiments, suggested annotations may appear for the screen sharing user's approval. The suggested annotations may comprise a timestamp and an indication as to which viewing user submitted the annotation. The screen sharing user may select to approve of the annotations by selecting an approve option such as a check box or other control corresponding to each annotation. In some embodiments, the screen sharing user may later delete (or temporarily disable) any annotation by selecting a delete option corresponding to each annotation or by unchecking the appropriate checkbox. The screen sharing user may select an option to delete or disable all of the annotations at once to provide a fresh screen. In some embodiments, the screen sharing user may manipulate annotations after they are posted. For example, a viewing user may have submitted a sticky note which the screen sharing user wishes to move. The screen sharing user may click and drag the sticky note to a new location on the screen. Annotations may be moved, resized, or modified by the screen sharing user or (in some embodiments) by the annotating user. In some embodiments, any of the viewing users may modify any of the annotations as well if the screen sharing user has selected the appropriate permissions. The screen sharing user may also control multiple layers of annotations. For example, a screen sharing user may be displaying the first page of a presentation which received annotations. The screen sharing user may wish to store the annotations as a layer and hide them as the screen sharing user proceeds to the second page. Then, the screen sharing user may wish to unhide the annotation layer later in the presentation when returning to the first screen. By grouping annotations as layers, the screen sharing user gains more granular control of the annotations.

FIG. 5A depicts an exemplary user interface 500 for a viewing user who has joined a synchronous multimedia collaboration session and is viewing the shared screen of another user. In some embodiments, the screen share may be a pane within the group-based communication system. The viewing user may also elect to view a screen share as a full screen window, or as a pop-out window. The screen share allows the viewing user to view the screen of the screen sharing user in real time. As the screen sharing user makes updates, the updates will appear automatically for the viewing user. In some embodiments, video display 502 may show a video view of the screen sharing user. For example, the screen sharing user may have a webcam and wish to show their face as they discuss updates to a particular file. As depicted, the screen sharing user has launched an application in window 402 and initiated a screen share, as described above with respect to FIGS. 4A-4C. As shown in FIG. 4A, one case is simply where the viewing user can passively view the screen of the screen sharing user. For example, the viewing user may watch the screen sharing user give a presentation prior to working with the screen sharing user to mark up the presentation screen share and then revise the presentation document itself.

FIG. 5B depicts an exemplary user interface 550 for a viewing user who has joined a synchronous multimedia collaboration session to view a screen share in which the viewing user is annotating the shared screen. Annotation toolbar 552 provides the viewing user with various tools with which the viewing user can mark up, comment or, or otherwise editorialize the screen share to provide information to other viewing users. In some embodiments, the viewing user may use the annotation tools for personal purposes and not actually submit the annotations for public display. In particular, embodiments of the invention provide for novel annotation features such as sticky notes that can be placed anywhere on the shared screen, spotlight tools that highlight a particular region of the screen share region to draw attention to that region for discussion, and placed emojis for non-verbal, unintrusive feedback during a screen share session.

As a first example of an annotation feature contemplated for use with embodiments of the invention, annotation toolbar 552 may comprise draw tool 554 which permits a viewing user to freely draw over the screen share to produce free-form drawing annotation 566. In some embodiments, a viewing user may select which color they would like to use. In further embodiments, colors may be assigned to certain users based on roles. For example, the development team may draw in blue whereas the marketing team draws in green. In other embodiments, the viewing users may select different patterns, sizes, or types of drawing annotations they wish to make. For example, a first user may elect to draw in black using a fine point, resembling a pen, whereas a second user may elect to draw in green using a larger point, resembling a crayon. The various drawn annotations can be made on top of particular moments, locations, or sections of the screen share, and persisted with the screen share as described below with respect to FIG. 6.

As a second example of an annotation feature contemplated for use with embodiments of the invention, annotation toolbar 552 may comprise sticky note tool 556 which allows a user to add a sticky note annotation 564 to the shared screen. Sticky note annotation 564 may be a rectangular image comprising a text field. The text field within the sticky note may be editable by the users. The text field may provide users with the ability to bold, underline, or otherwise modify the text, including selecting different font types and sizes. In some embodiments, only the user placing the sticky note may edit the sticky note. In further embodiments, only the placing user and the screen sharing user may edit sticky notes once they are placed. Sticky notes may display as any color including text of any color. For example, they may be yellow to resemble the most common type of sticky note. In some embodiments, sticky notes may be partially or wholly transparent so as to not occlude the screen share image. In some such embodiments, this partial transparency may be dynamically toggleable. In some embodiments, sticky note annotation 564 may comprise additional ornamentation to make sticky note annotation 564 resemble physical sticky notes. The various sticky note annotations can be made on top of particular moments, locations, or sections of the screen share, and persisted with the screen share as described below with respect to FIG. 6.

As a third example of an annotation feature contemplated for use with embodiments of the invention, annotation toolbar 552 may comprise focus tool 558 which allows a user to select a portion of the screen for emphasis. The selected portion may be a block of text, a rectangular area, a circular area, or an area of any other shape. In some embodiments, focus tool 558 may highlight the selected portion. For example, selecting text with focus tool 558 may highlight the selected text in a bright yellow. In further embodiments, focus tool 558 may blur out the portions of the screen outside of a selected area using, for example, a gaussian blur filter on the non-selected portions. For example, a user may select the door on an image of a house to gray out all of the house except the door. As another example, a user may select the door on an image of a house and cause the door to remain in focus while the rest of the house becomes blurry. In some embodiments, focus tool 558 may include zoom functionality. For example, a selected portion of the screen may be zoomed in and appear larger after being selected. Alternatively, or in addition, focus tool 558 may provide for spotlight functionality, by causing a partially opaque filter to be superimposed over the non-selected portions, causing the selected portion to be emphasized (or spotlighted) by contrast. The various focus annotations (such as spotlighted regions) can be made on top of particular moments, locations, or sections of the screen share, and persisted with the screen share as described below with respect to FIG. 6.

As a fourth example of an annotation feature contemplated for use with embodiments of the invention, annotation toolbar 552 may comprise content tool 560 which permits a user to insert content objects into the screen share. Content may be files, including images and videos. In some embodiments, content may be group-based communication system objects. For example, a viewing user may wish to add a selected message from posted in the group-based communication system to the shared screen. The viewing user may select the message or other object to display over the shared screen. In some embodiments, users, channels, or documents can be mentioned using an appropriate symbol (such as "@," "!," or "#") in an annotation to link or otherwise include them in the annotation. In some embodiments, viewing users may be able to select content added via content tool 560 to instantly link to that content. For example, a user selecting an image added via content tool 560 may be able to download the image. As another example, a user selecting a group-based communication system channel added via content tool 560 may be able to instantly open the channel within the group-based communication system. The inserted objects can be made on top of particular moments, locations, or sections of the screen share, and persisted with the screen share as described below with respect to FIG. 6.

Annotation toolbar 552 may further comprise save tool 562 which allows the user to manually save an annotated screenshot. Broadly speaking, annotations may be manually persisted or may be automatically persisted based on a variety of criteria. In some embodiments, a user selecting save tool 562 will be provided with an additional menu allowing the user to select the save settings the user would like to apply. In some embodiments, a user may desire to save only the annotations without the shared screen. For example, a user may have been taking notes in a sticky note and wish to persist the sticky note, but not care about the underlying screen share content. A user may also specify which format the user would like to save the annotated screen share as. For example, the user may wish to save the annotated screen share as an image just like a traditional screenshot. In other embodiments, the user may wish to save additional metadata about the annotated screen share including when it was shared and which users added annotations. In some embodiments, a saving user may save the metadata by annotation type, chronologically, or based on the name of the user making the annotation.

In some embodiments, screen share annotations may be automatically persisted instead of (or in addition to) being manually persisted by the user using save tool 562. For example, in some embodiments, any time a user adds an annotation, the annotation may automatically be persisted to a location associated with the screen share session. For example, if the screen share takes place in a synchronous multimedia collaboration session that was initiated from within a channel, each annotation made may be persisted to that channel as it is made. Similarly, in some embodiments, when one or more annotations are cleared from the screen share, those annotations may be automatically persisted to the associated channel.

In other embodiments, annotations may automatically be persisted based on the application being shared. For example, sticky note annotations made when viewing a Portable Document Format (PDF) document may automatically be persisted in the document as native annotations. Similarly, if reaction emoji posted during a presentation may automatically trigger persisting a video of the immediately previous section of the presentation, together with the reaction emoji, to automatically save significant moments of the presentation.

In still other embodiments, only particular types of annotations are automatically persisted. For example, sticky note annotations may always be persisted as memorialization of to-do lists, action items, requests, or other persistent notes. By contrast, focus annotations such as a laser pointer annotation or a spotlight annotation may be more useful for conversation in the moment, and may not be persisted unless a user manually persists them using, for example, save tool 562.

FIG. 5B depicts an exemplary user interface 550 for a viewing user who has joined a synchronous multimedia collaboration session to view a screen share in which the viewing user is collaborative working on the shared screen with the screen sharing user. In some embodiments, the viewing user may be able to annotate the screen share (as discussed below with respect to FIG. 5B) and/or collaborate with the screen sharing user. For example, the application being shared may natively support multiple cursors for multiple concurrent editors, such that each editing (or viewing) user can see all edits in real time. As depicted, the viewing user is editing in window 402 using cursor 572, while screen sharing user is editing in window 402 using cursor 474. In some embodiments, each cursor may have an icon, name or other identifying indicium for the associated user to make it clear which user is making which edits. In some embodiments, the application being shared may not natively support multiple cursors. For example, the application being shared may be an application such as a web browser that is designed to be operated by only a single user at a time. In such cases, the group-based communication system may itself provide multiple cursors. In some embodiments, this is effectuated by overlaying a cursor for the viewing user (i.e., a user other than the sharing user) in both window 402 of the sharing user's user interface 400 and in interface 500 of the viewing user as it displays window 402 if the sharing user. When the viewing user wishes to interact with window 402, the group-based communication system can inject synthetic keyboard events, mouse events, or other user interface actions into the window 402 of the screen sharing user to simulate an application that natively supports concurrent interaction by multiple users using multiple cursors.

FIG. 6 depicts an exemplary user interface 600 for a group-based communication system for persisting annotated screen shares. In some embodiments, every saved screen share from a synchronous multimedia collaboration session is automatically saved to the corresponding virtual space at the conclusion of the synchronous multimedia collaboration session. The annotated screen shares may appear to have been posted by the user that selected to save the annotated screen share. In some embodiments, the annotated screen shares may be grouped together in a container. For example, a container may group all of the annotated screen shares from an entire synchronous multimedia collaboration session and save information corresponding on which users attended, which users saved annotated screen shares, which users presented, and any other information from the synchronous multimedia collaboration session. In some embodiments, annotated screen shares may be persisted as image annotated screen share 602. Image annotated screen share 602 may be any image file type such as gif, png, or jpeg. In some embodiments, image annotated screen share 602 may be an animated image type, such as a gif, which may show changes over time, or as a video file type such as an mpg or avi. For example, a user may wish to show an entire synchronous multimedia collaboration session as a time lapse. In some embodiments, annotated screen shares may be persisted as native annotated screen share 604. Native annotated screen share 604 may be available for select files which can interface with the group-based communication system to allow for native annotations. For example, a presentation application may include a notes space associated with each slide. An annotated screen share which was saved while the third presentation slide was being displayed may automatically be added to the notes space associated with the third presentation slide, thus allowing native feedback.

Annotated screen shares may be automatically persisted within the group-based communication system in a variety of virtual spaces. For example, as described above, if a presentation document is being given via screen share in a synchronous multimedia collaboration session that was started within a particular channel of the group-based communication system, then any annotations made during the course of the presentation may be persisted natively within the presentation document (for example, if the presentation document is a collaborative document), Similarly, while the synchronous multimedia collaboration session is ongoing, any annotations may be available in a dedicated virtual space associated with the synchronous multimedia collaboration session (such as for example, a group-based communication system thread dedicated to the synchronous multimedia collaboration session). Alternatively, or in addition, the annotations may be persisted more durably in the channel in which the synchronous multimedia collaboration session was begun. As yet another alternative, a dedicated collaborative document may be created associated with the screen share session to store any annotations which are made over the course of the screen share session, and to provide a location for further work on any action items raised as annotation ides during the collaboration session.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by at least one processor, perform a method for persisting annotated screen shares within a group-based communication system, comprising:
receiving a share request for a shared screen from a first user within a synchronous multimedia collaboration session, the synchronous multimedia collaboration session initiated from a channel of the group-based communication system;
in response to receiving the share request, displaying the shared screen to a second user who is a member of the synchronous multimedia collaboration session;
receiving an annotation on the shared screen from the second user;
causing display of the annotation overlaid on the shared screen to create an annotated screen share,
wherein the annotation is modifiable by other members of the synchronous multimedia collaboration session;
while the shared screen is being displayed, receiving a first save request to save a first portion of the annotated screen share;
automatically persisting the first portion of the annotated screen share to the channel from which the synchronous multimedia collaboration session was initiated;
receiving a second save request to save a second portion of the annotated screen share; and
responsive to receiving the second save request, automatically persisting the second portion of the annotated screen share to the channel.

2. The media of claim 1, wherein the annotation comprises an overlaid annotation interface including comments provided by the second user.

3. The media of claim 1, wherein the annotation comprises a focus interface tool directing focus to a first area of the shared screen to differentiate from a second area of the shared screen.

4. The media of claim 1,
wherein the share request is a request to share an application of the first user with the second user, and
wherein the application is simultaneously interactable with by the first user and the second user.

5. The media of claim 4, wherein the application in the shared screen displayed to the second user is displayed in a browser, and wherein a shared cursor is provided by the group-based communication system allowing the first user and the second user to interact with the application displayed in the browser.

6. The media of claim 1, the method further comprising:
providing, in the shared screen displayed to the second user, a shared cursor for the second user, the shared cursor allowing both the first user and the second user to concurrently interact with elements of the shared screen.

7. The media of claim 6, wherein the shared cursor is provided by the group-based communication system to enable a collaboration functionality allowing both the first user and the second user to interact with the shared cursor of an application.

8. A method for persisting annotated screen shares within a group-based communication system, comprising:
receiving a share request for a shared screen from a first user within a synchronous multimedia collaboration session, the synchronous multimedia collaboration session initiated from a channel of the group-based communication system;
in response to receiving the share request, displaying the shared screen to a second user who is a member of the synchronous multimedia collaboration session;
receiving an annotation on the shared screen from the second user;
causing display of the annotation overlaid on the shared screen to create an annotated screen share,
wherein the annotation is modifiable by other members of the synchronous multimedia collaboration session;
while the shared screen is being displayed, receiving a first save request to save a first portion of the annotated screen share; and
automatically persisting the first portion of the annotated screen share to the channel from which the synchronous multimedia collaboration session was initiated;
receiving a second save request to save a second portion of the annotated screen share; and
responsive to receiving the second save request, automatically persisting the second portion of the annotated screen share to the channel.

9. The method of claim 8, wherein the annotation comprises an overlaid annotation interface including comments provided by the second user.

10. The method of claim 8, wherein the annotation comprises a focus interface tool directing focus to a first area of the shared screen to differentiate from a second area of the shared screen.

11. The method of claim 8,
wherein the share request is a request to share an application of the first user with the second user, and
wherein the application is simultaneously interactable with by the first user and the second user.

12. The method of claim 11, wherein the application in the shared screen displayed to the second user is displayed in a browser, and wherein a shared cursor is provided by the group-based communication system allowing the first user and the second user to interact with the application displayed in the browser.

13. The method of claim 8, further comprising:
providing, in the shared screen displayed to the second user, a shared cursor for the second user, the shared cursor allowing both the first user and the second user to concurrently interact with elements of the shared screen.

14. The method of claim 13, wherein the shared cursor is provided by the group-based communication system to enable a collaboration functionality allowing both the first user and the second user to interact with the shared cursor of an application.

15. A system for persisting annotated screen shares within a group-based communication system, the system comprising:
a data store;
at least one processor; and
one or more non-transitory computer-readable media storing computer-executable instructions that, when executed by the at least one processor, perform a method for persisting the annotated screen shares within the group-based communication system, comprising:

receiving a share request for a shared screen from a first user within a synchronous multimedia collaboration session, the synchronous multimedia collaboration session initiated from a channel of the group-based communication system;

in response to receiving the share request, displaying the shared screen to a second user who is a member of the synchronous multimedia collaboration session;

receiving an annotation on the shared screen from the second user;

causing display of the annotation overlaid on the shared screen to create an annotated screen share, wherein the annotation is modifiable by other members of the synchronous multimedia collaboration session;

while the shared screen is being displayed, receiving a first save request to save a first portion of the annotated screen share; and automatically persisting the first portion of the annotated screen share to the channel from which the synchronous multimedia collaboration session was initiated;

receiving a second save request to save a second portion of the annotated screen share; and responsive to receiving the second save request, automatically persisting the second portion of the annotated screen share to the channel.

16. The system of claim 15, wherein the annotation comprises an overlaid annotation interface including comments provided by the second user.

17. The system of claim 15, wherein the annotation comprises a focus interface tool directing focus to a first area of the shared screen to differentiate from a second area of the shared screen.

18. The system of claim 15,
wherein the share request is a request to share an application of the first user with the second user, and
wherein the application is simultaneously interactable with by the first user and the second user.

19. The system of claim 18, wherein the application in the shared screen displayed to the second user is displayed in a browser, and wherein a shared cursor is provided by the group-based communication system allowing the first user and the second user to interact with the application displayed in the browser.

20. The system of claim 15, the method further comprising:

providing, in the shared screen displayed to the second user, a shared cursor for the second user, the shared cursor allowing the second user to interact with the shared screen of the first user.

\* \* \* \* \*